US012521981B2

(12) United States Patent
Fujii

(10) Patent No.: US 12,521,981 B2
(45) Date of Patent: Jan. 13, 2026

(54) HEAD SUBSTRATE

(71) Applicant: CANON KABUSHIKI KAISHA, Tokyo (JP)

(72) Inventor: Yasuo Fujii, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 161 days.

(21) Appl. No.: 18/380,717

(22) Filed: Oct. 17, 2023

(65) Prior Publication Data

US 2024/0181771 A1 Jun. 6, 2024

(30) Foreign Application Priority Data

Dec. 6, 2022 (JP) ................................ 2022-194899

(51) Int. Cl.
*B41J 2/14* (2006.01)
*B41J 2/045* (2006.01)

(52) U.S. Cl.
CPC ......... *B41J 2/04536* (2013.01); *B41J 2/0458* (2013.01)

(58) Field of Classification Search
None
See application file for complete search history.

(56) References Cited

U.S. PATENT DOCUMENTS 8,231,195 B2 7/2012 Kubo et al.
2005/0190222 A1* 9/2005 Nakajima ............ B41J 2/04563 347/14
2009/0278878 A1 11/2009 Kubo et al.
2010/0053278 A1* 3/2010 Omata ................. B41J 2/04528 216/17

FOREIGN PATENT DOCUMENTS

JP 5430215 B2 2/2014

* cited by examiner

*Primary Examiner* — Scott A Richmond
(74) *Attorney, Agent, or Firm* — VENABLE LLP

(57) ABSTRACT

A head substrate including a plurality of arrays in each of which a plurality of liquid ejection heads for ejecting a liquid and a plurality of heaters are disposed, includes: one or more first reception units configured to receive communication data including heater selection data on a plurality of arrays, the heater selection data being for selecting the heaters; and one second reception unit configured to receive communication data including heater selection data on a single array and setting data.

9 Claims, 34 Drawing Sheets

FIG.3
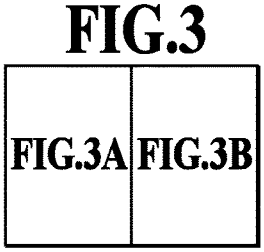
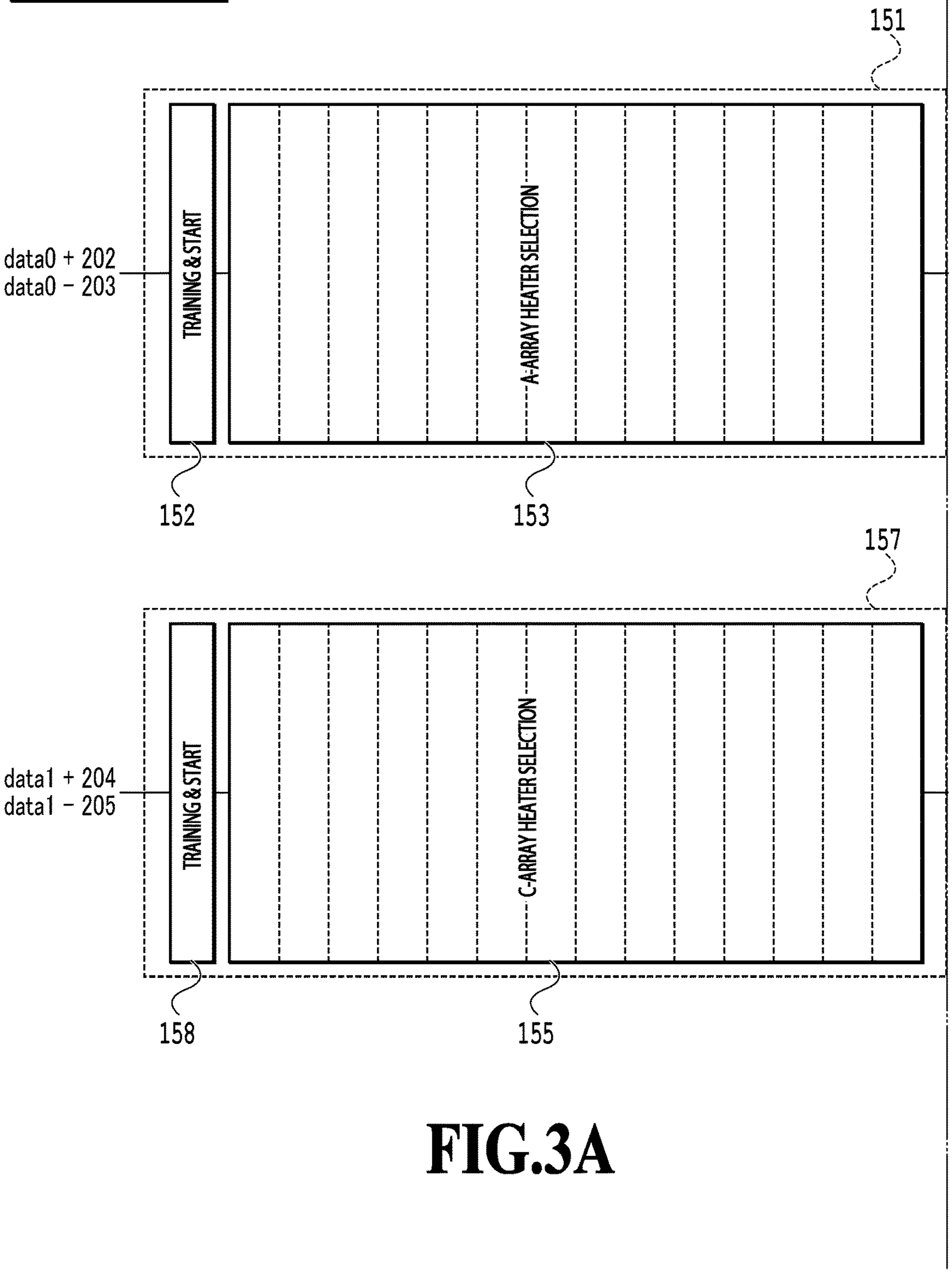
FIG.3A

| FIG.4A | FIG.4B | FIG.4C |
|---|---|---|

| FIG.11A | FIG11B |
|---|---|

| FIG.14A | FIG14B |
| --- | --- |

| FIG.15A | FIG.15B | FIG.15C |
|---|---|---|

| FIG.18A | FIG.18B | FIG.18C |
| --- | --- | --- |

HEAD SUBSTRATE

BACKGROUND OF THE DISCLOSURE

Field of the Disclosure

The present disclosure relates to a head substrate to be used in an inkjet print head including heaters as energy generation elements for ejecting a liquid.

Description of the Related Art

Substrates used in inkjet print heads have a shift register that designates heaters and data input terminals for the shift register for each heater array regardless of the number of heaters in each heater array. Accordingly, the number of data input terminals provided to the substrate increases as the number of heater arrays increases. In Japanese Patent No. 5430215 (hereinafter, referred to as Document 1), for heater arrays that have a small number of heaters, a common shift register and data input terminal are provided for each two heater arrays to reduce the number of data input terminals.

The printing apparatus of Document 1 uses one data input terminal for each two array having a small number of heaters and uses one data input terminal for each one array having a large number of heaters. Accordingly, the number of data input terminals increases by one as the number of heater arrays increases by two in the case of arrays having a small number of heaters, and increases by one as the number of heater arrays increases by one in the case of arrays having a large number of heaters. Thus, the number of data input terminals increases as the number of heater arrays increases. Increasing the number of data input terminals increases the number of input circuits and hence increases the current to be consumed. As a result, the sizes of the substrate of the inkjet print head, an electric wiring board, and flexible cables increase. Also, electrode portions are generally protected with a sealant to avoid contact between electrodes and inks. As the number of electrodes increases, the number of sealing regions increases as well, thereby increasing the possibility of decreased reliability.

SUMMARY OF THE DISCLOSURE

A head substrate of the present disclosure is a head substrate including a plurality of arrays in each of which a plurality of liquid ejection heads for ejecting a liquid and a plurality of heaters are disposed, the head substrate including: one or more first reception units configured to receive communication data including heater selection data on a plurality of arrays, the heater selection data being for selecting the heaters; and one second reception unit configured to receive communication data including heater selection data on a single array and setting data.

Further features of the present disclosure will become apparent from the following description of exemplary embodiments with reference to the attached drawings.

DESCRIPTION OF THE EMBODIMENTS

Figure 1:
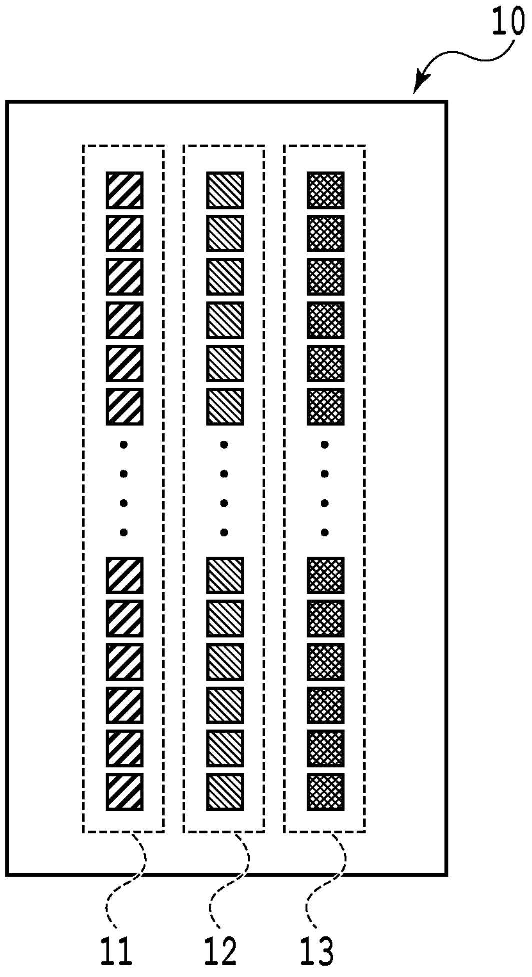
FIG. 1 is a diagram illustrating color assignment of each array in an inkjet print head as liquid ejection heads according to a first embodiment of the present disclosure.

Hereinafter, with reference to the attached drawings, the present disclosure is explained in detail in accordance with preferred embodiments. Configurations shown in the following embodiments are merely exemplary and the present disclosure is not limited to the configurations shown schematically. In addition, the same components are denoted by the same reference numerals.

First Embodiment

FIG. 1 illustrates color assignment of each array in an inkjet print head as liquid ejection heads according to a first embodiment of the present disclosure. An inkjet print head 10 uses three colors of cyan 11, magenta 12, and yellow 13. Plural liquid ejection heads that eject a liquid including an ink are disposed in an array. The inkjet print head 10 includes a plurality of arrays in each of which liquid ejection heads are disposed for each color.

Figure 2:
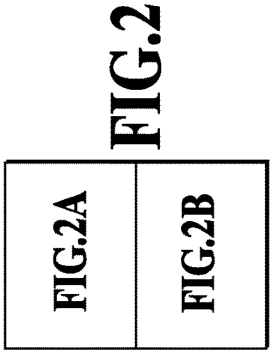
FIG. 2 is a diagram showing the relationship of FIGS. 2A and 2B, and FIGS. 2A and 2B are front surface diagrams illustrating a head substrate in the inkjet print head according to the first embodiment.
Figure 2A:
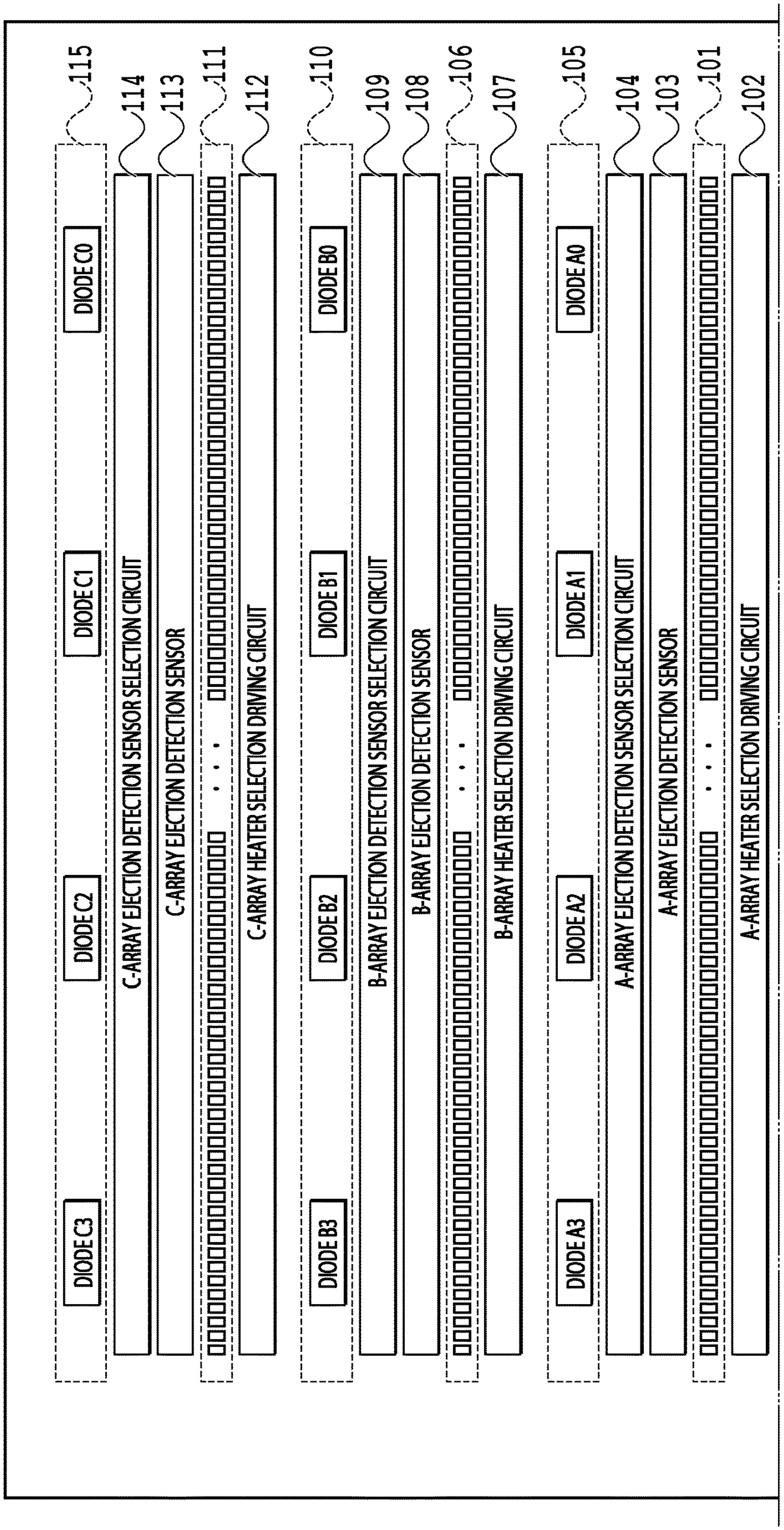
Figure 2B:
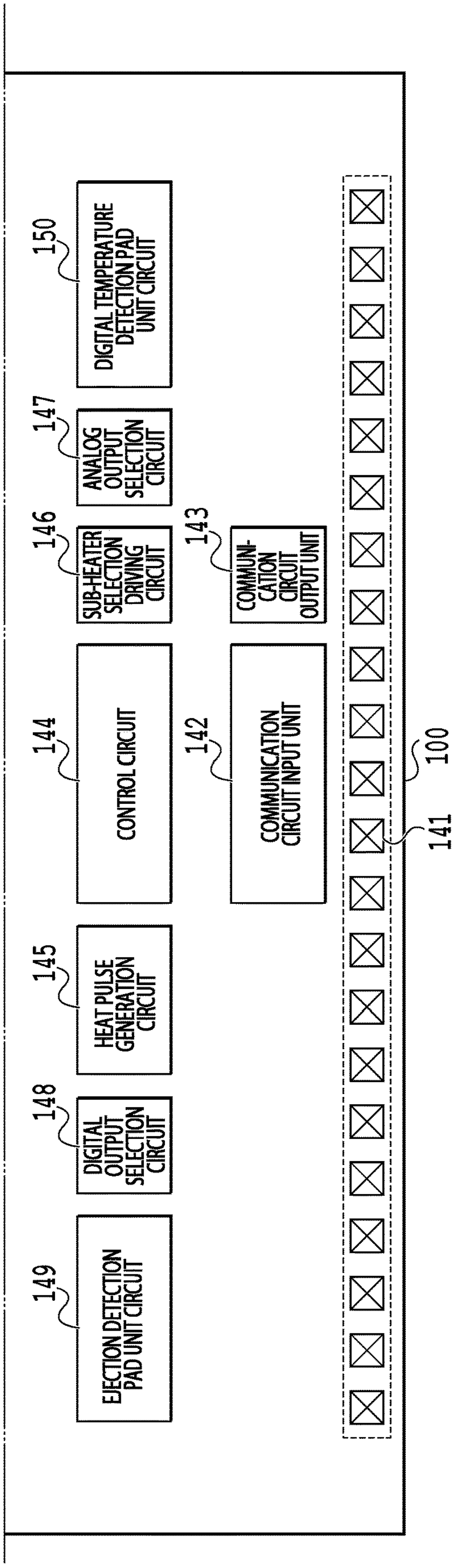

FIGS. 2A and 2B illustrate a head substrate in the inkjet print head according to the first embodiment. A head substrate 100 has 1200-dpi liquid ejection heads, and includes heaters as energy generation elements for ejecting liquids including inks from the liquid ejection heads. A-array heaters 101, B-array heaters 106, and C-array heaters 111 are disposed in the head substrate 100. An A-array heater selection driving circuit 102, a B-array heater selection driving circuit 107, and a C-array heater selection driving circuit 112 each select desired heaters from the corresponding heater array and drive a driver (not shown) to cause the heaters to heat to eject the liquid (not shown). Heater arrays of the colors of the cyan 11, the magenta 12, and the yellow 13 are assigned to be the heater arrays of the A-array heaters 101, the B-array heaters 106, and the C-array heaters 111 as desired.

A-array ejection detection sensors 103, B-array ejection detection sensors 108, and a C-array ejection detection sensors 113, which are temperature sensors, are disposed near respective heaters to detect ink ejection. An A-array ejection detection sensor selection circuit 104, a B-array ejection detection sensor selection circuit 109, and a C-array ejection detection sensor selection circuit 114 select any one of these ejection detection sensors. Diodes A0 to A3_105, diodes B0 to B3_110, and diodes C0 to C3_115 are used to detect the temperature of the head substrate 100 in order to perform ink ejection at an appropriate temperature.

Plural electrodes 141 are disposed to connect a power supply, ground, signals, and so on to an external apparatus. A communication circuit input unit 142 receives input signals from the electrodes 141 and transfers the input signals to circuits in the head substrate 100. A communication circuit output unit 143 receives output signals from circuits in the head substrate 100 and outputs the output signals to the external apparatus or the like from the electrodes 141.

A control circuit 144 includes a digital processing circuit that controls the head substrate 100 based on signals inputted from the communication circuit input unit 142. A heat pulse generation circuit 145 generates driving pulses for the drivers (not shown) for the A-array heater selection driving circuit 102, the B-array heater selection driving circuit 107, and the C-array heater selection driving circuit 112 in response to an instruction from the control circuit 144.

A sub-heater selection driving circuit 146 selects sub-heaters (not shown), which are heating elements, and drives the sub-heaters to reach a predetermined temperature of the head substrate 100 in order to bring the temperature of the head substrate 100 to an appropriate temperature for ink ejection in response to an instruction from the control circuit 144. There are 12 sub-heaters are corresponding to the diodes A0 to A3_105, the diodes B0 to B3_110, and the diodes C0 to C3_115, and these are disposed near the heaters. An analog output selection circuit 147 selects any one of the diodes A0 to A3_105, the diodes B0 to B3_110, and the diodes C0 to C3_115 and selects monitored output of an analog circuit (not shown) in response to an instruction from the control circuit 144. For example, using a diode as an element to detect temperature or the like, the analog circuit detects a change in the current flowing through the diode, converts the change in the current into a monitored value of the substrate temperature or the like, and outputs the monitored value.

A digital output selection circuit 148 selects monitored output of a digital circuit (not shown) in response to an instruction from the control circuit 144. The digital circuit is capable of monitoring any digital signals in the head substrate 100. An ejection detection PAD unit circuit 149 analyzes the sensor output of a selected one of the A-array ejection detection sensor selection circuit 104, the B-array ejection detection sensor selection circuit 109, and the C-array ejection detection sensor selection circuit 114 in response to an instruction from the control circuit 144. The analysis result, such as whether ejection is performed or not, is outputted from the electrodes 141 through the communication circuit output unit 143. A digital temperature detection PAD unit circuit 150 obtains a monitored output from one diode selected from among the diodes A0 to A3_105, the diodes B0 to B3_110, and the diodes C0 to C3_115 in response to an instruction from the control circuit 144. The result of analog-digital conversion of this monitored output is outputted from the electrodes 141 through the communication circuit output unit 143.

Figure 3B:
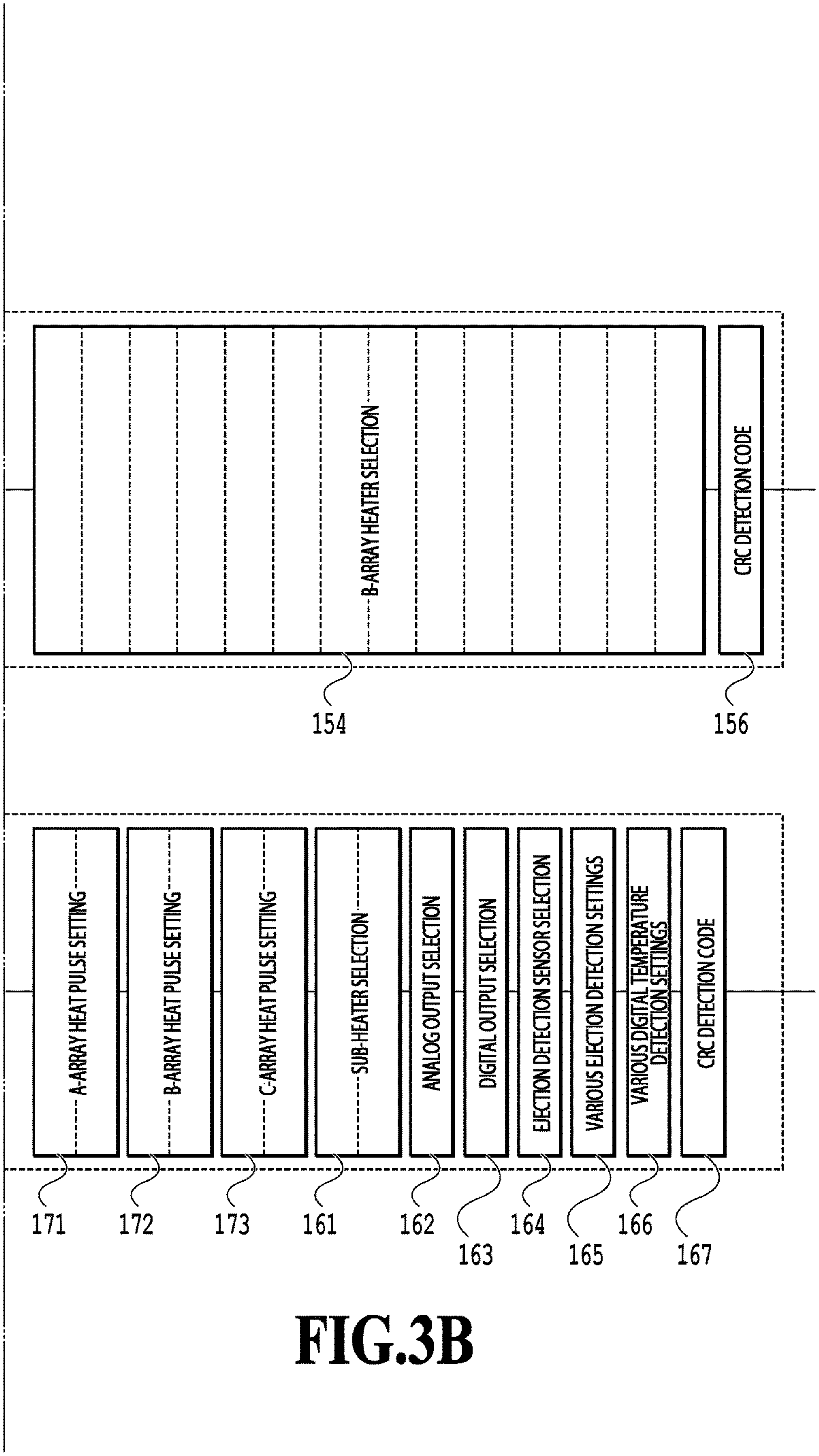
FIG. 3 is a diagram showing the relationship of FIGS. 3A and 3B, and FIGS. 3A and 3B are diagrams illustrating a communication data format for the head substrate according to the first embodiment.

FIGS. 3A and 3B illustrate communication data formats for the head substrate according to the first embodiment. Communication data 151 inputted from data0+202 and data0−203 of the electrodes 141 starts with training & start 152, which is 1 byte. The next A-array heater selection 153, which is 14 bytes, is heater selection data for selecting heaters, and designates desired heaters to be selected by the A-array heater selection driving circuit 102. B-array heater selection 154, which is 14 bytes, designates desired heaters to be selected by the B-array heater selection driving circuit 107. Cyclic redundancy check (CRC) detection code 156, which is 1 byte, designates a CRC calculation value of the A-array heater selection 153 and the B-array heater selection 154, and the communication data 151 ends. In a case where CRC calculation value calculated by the control circuit 144 and the CRC detection code 156 match each other, it is determined that the communication data 151 has been normally received.

The A-array heaters 101, the B-array heaters 106, and the C-array heaters 111 include 1664 heaters, and time-division driving is performed with 16 time slots. Thus, the number of heaters to be simultaneously driven is 104. One bit is assigned to each one of the heaters to be simultaneously driven, so that the heaters are represented with 104 bits=13 bytes. The 16 time division can be represented by 4 bit decoding, and is therefore represented using 1 byte using additional unused bits. Accordingly, each of the A-array heaters 101, the B-array heaters 106, and the C-array heaters 111 includes 14 bytes in total.

Communication data 157 inputted from data1+204 and data1−205 of the electrodes 141 starts with training & start 158, which is 1 byte. The next C-array heater selection 155, which is 14 bytes, designates desired heaters to be selected by the C-array heater selection driving circuit 112. A-array heat pulse setting 171, which is 2 bytes, designates the driving pulses for the driver (not shown) for the A-array heater selection driving circuit 102. B-array heat pulse setting 172, which is 2 bytes, designates the driving pulses for the driver (not shown) for the B-array heater selection driving circuit 107. C-array heat pulse setting 173, which is 2 bytes, designates the driving pulses for the driver (not shown) for the C-array heater selection driving circuit 112.

Sub-heater selection 161, which is 2 bytes, designates sub-heaters to be driven from among the 12 sub-heaters (not shown), which are heating elements. Analog output selection 162 designates one of the diodes A0 to A3_105, the diodes B0 to B3_110, and the diodes C0 to C3_115. Specifically, the analog output selection 162 selects an analog signal from a diode to be used as a detection element. Digital output selection 163 selects the monitored output of the digital circuit (not shown).

Ejection detection sensor selection 164 designates the A-array ejection detection sensor 103, the B-array ejection detection sensor 108, and the C-array ejection detection sensor 113 to be selected by the A-array ejection detection sensor selection circuit 104, the B-array ejection detection sensor selection circuit 109, and the C-array ejection detection sensor selection circuit 114. Various ejection detection settings 165 designate a circuit constant of the ejection detection PAD unit circuit 149 and the like.

Various digital temperature detection settings 166 designate a circuit setting value of the digital temperature detection PAD unit circuit 150 and the like. CRC detection code 167, which is 1 byte, designates a CRC calculation value of the C-array heater selection 155 to the various digital temperature detection settings 166, and the communication data 157 ends. In a case where a CRC calculation value calculated by the control circuit 144 is the same as the CRC detection code 167, it is determined that the communication data 157 has been normally received.

Figures 4, 4A:
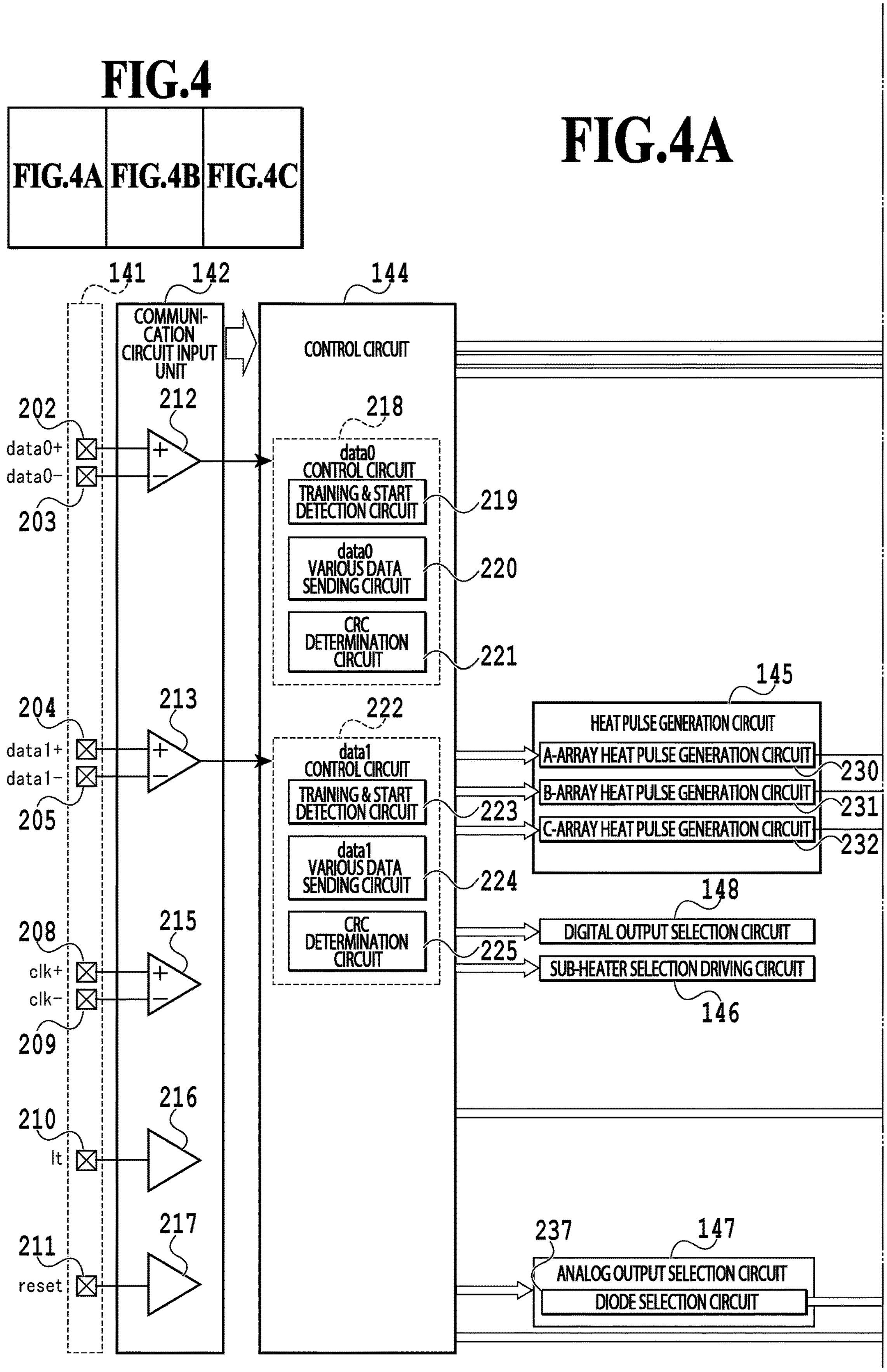
FIG. 4 is a diagram showing the relationship of FIGS. 4A, 4B and 4C, and FIGS. 4A, 4B and 4C are block diagrams of the head substrate according to the first embodiment.
Figure 4B:
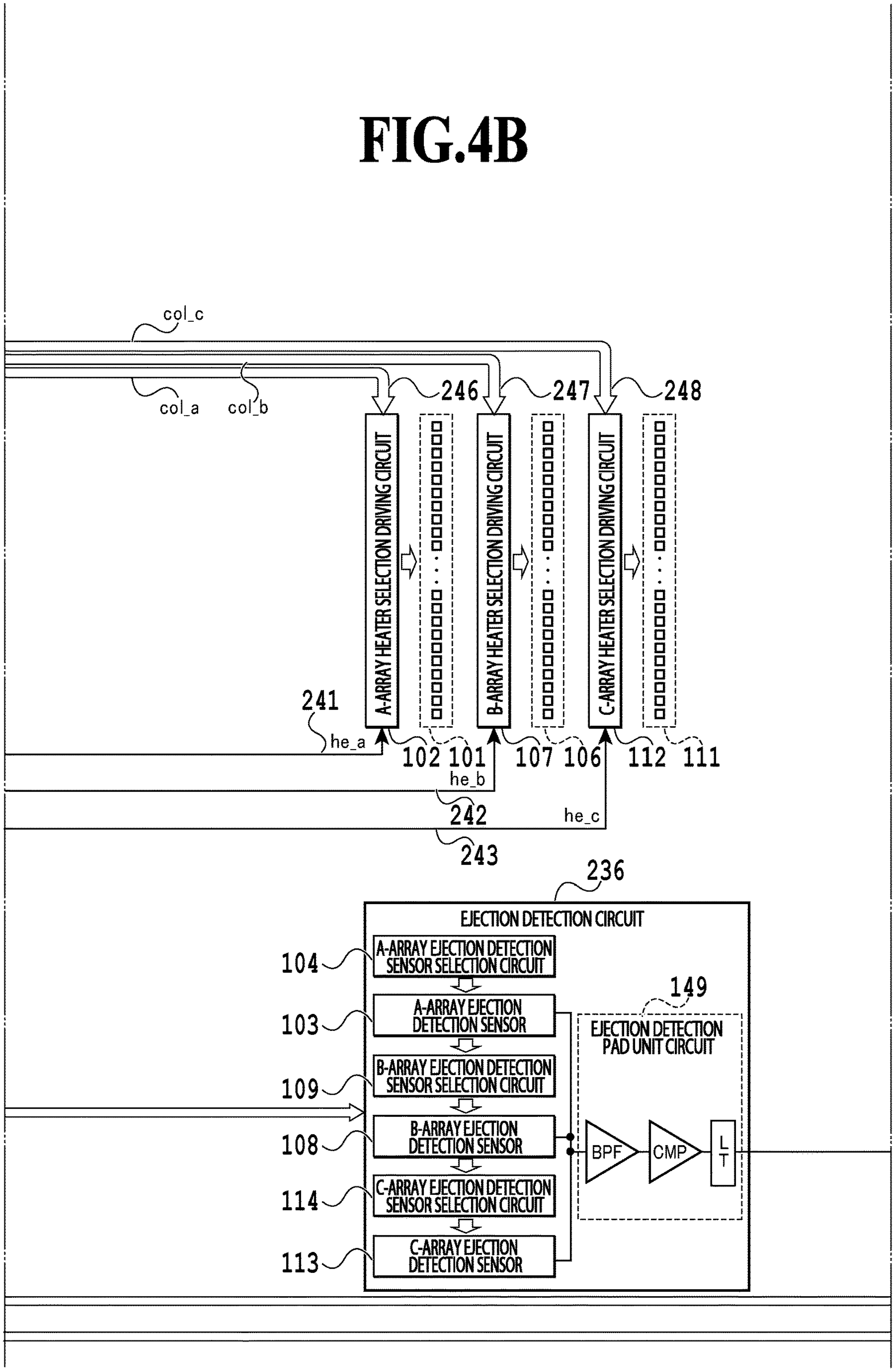
Figure 4C:
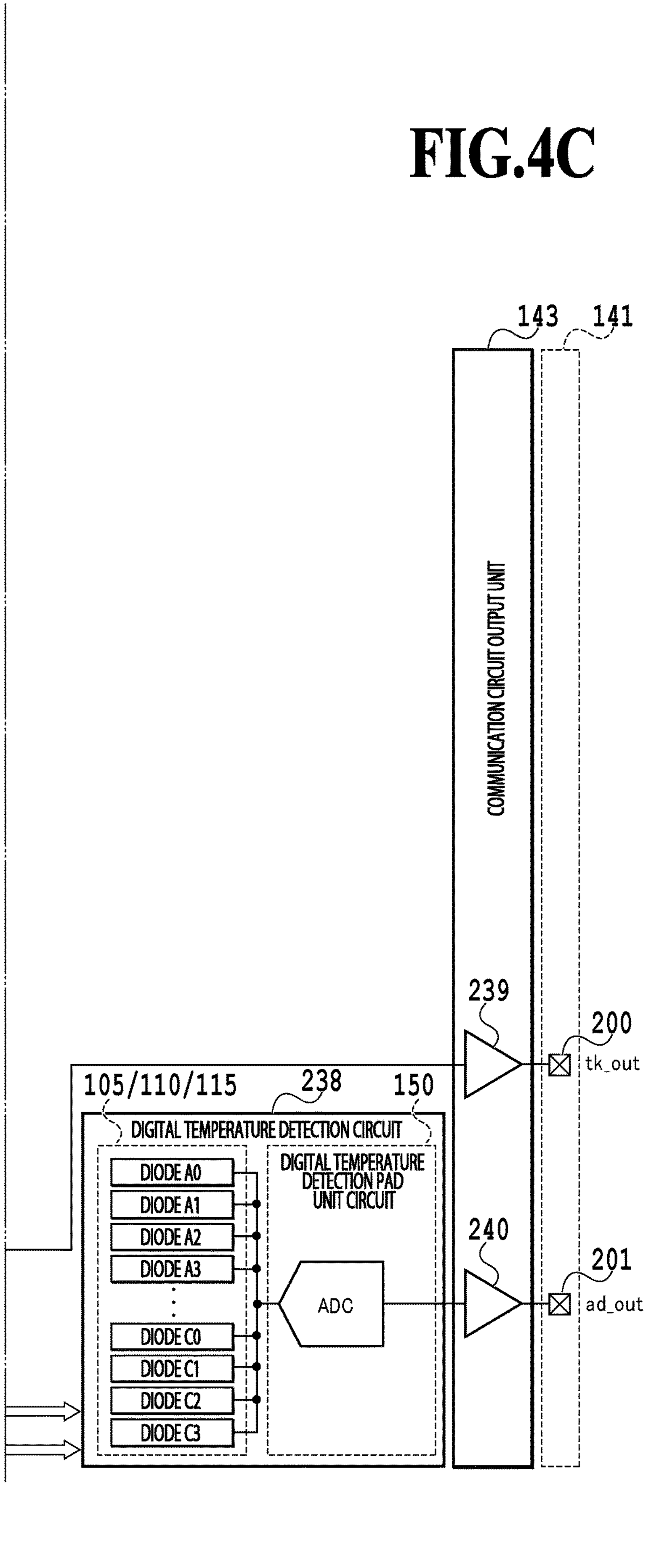

FIGS. 4A, 4B and 4C illustrate block configurations of the head substrate according to the first embodiment. Input signals into the communication circuit input unit 142 from the electrodes 141 include data0+202, data0−203, data1+204, data1−205, clk+208, clk−209, lt210, and reset211. Here, data0+202, data0−203, data1+204, data1−205, clk+208, and clk−209 are differential signals complying with a low voltage differential signaling (LVDS) standard. These are connected to LVDS receivers 212, 213, and 215. Also, lt210 is connected to an input buffer 216 and reset211 is connected to an input buffer 217.

The communication data 151 is inputted into data0+202 and data0−203, and the communication data 157 is inputted into data1+204 and data1−205. A common clock for the communication data 151 and the communication data 157 is inputted into clk+208 and clk−209. A latch signal for the communication data 151 and the communication data 157 is inputted into lt210. An initialization signal for the head substrate 100 is inputted into reset211.

Based on signals from the LVDS receivers 212, 213, and 215 and the input buffers 216 and 217, the control circuit 144 analyses the communication data 151 and the communication data 157. The control circuit 144 includes a data0 control circuit 218 and a data1 control circuit 222. The data0 control circuit 218 analyzes the communication data 151. The data1 control circuit 222 analyzes the communication data 157. The data0 control circuit 218 detects the training & start 152 in the communication data 151 with a training & start detection circuit 219. Then, a data0 various data sending circuit 220 sends the data of the A-array heater selection 153 to the A-array heater selection driving circuit 102 via col_a246. The data0 various data sending circuit 220 also sends the data of the B-array heater selection 154 to the B-array heater selection driving circuit 107 via col_b247. A CRC determination circuit 221 determines whether the CRC calculation value of the communication data 151 and the CRC detection code 156 match each other.

The data1 control circuit 222 detects the training & start 158 in the communication data 157 with a training & start detection circuit 223. Then, a data1 various data sending circuit 224 sends the data of the C-array heater selection 155 to the C-array heater selection driving circuit 112 via col_c248. The data1 various data sending circuit 224 also sends the data of the A-array heat pulse setting 171 to an A-array heat pulse generation circuit 230 of the heat pulse generation circuit 145. The data1 various data sending circuit 224 sends the data of the B-array heat pulse setting 172 to a B-array heat pulse generation circuit 231 of the heat pulse generation circuit 145. The data1 various data sending circuit 224 sends the data of the C-array heat pulse setting 173 to a C-array heat pulse generation circuit 232 of the heat pulse generation circuit 145.

The data1 various data sending circuit 224 sends the data of the sub-heater selection 161 to the sub-heater selection driving circuit 146, and sends the data of the analog output selection 162 to the analog output selection circuit 147. The data1 various data sending circuit 224 sends the data of the digital output selection 163 to the digital output selection circuit 148. The data1 various data sending circuit 224 sends the data of the ejection detection sensor selection 164 to the A-array ejection detection sensor selection circuit 104, the B-array ejection detection sensor selection circuit 109, and the C-array ejection detection sensor selection circuit 114 of an ejection detection circuit 236. The data1 various data sending circuit 224 sends the data of the various digital temperature detection settings 166 to the digital temperature detection PAD unit circuit 150. The data1 various data sending circuit 224 sends the data of the various ejection detection settings 165 to the ejection detection PAD unit circuit 149. Lastly, a CRC determination circuit 225 determines whether the CRC calculation value of the communication data 157 and the CRC detection code 156 match each other.

A heat pulse signal he_a241 generated by the A-array heat pulse generation circuit 230 is outputted to the A-array heater selection driving circuit 102. A heat pulse signal he_b242 generated by the B-array heat pulse generation circuit 231 is outputted to the B-array heater selection driving circuit 107. A heat pulse signal he_c243 generated by the C-array heat pulse generation circuit 232 is outputted to the C-array heater selection driving circuit 112.

The A-array ejection detection sensor selection circuit 104, the B-array ejection detection sensor selection circuit 109, and the C-array ejection detection sensor selection circuit 114 of the ejection detection circuit 236 respectively select one of the A-array ejection detection sensors 103, the B-array ejection detection sensors 108, and the C-array ejection detection sensors 113. The output voltages from the A-array ejection detection sensor 103, the B-array ejection detection sensor 108, and the C-array ejection detection sensor 113 are inputted into the ejection detection PAD unit circuit 149. A signal after frequency filtering (detection of a specific waveform generated during the ink ejection) by a band pass filter (BPF) in the ejection detection PAD unit circuit 149 is compared with an ejection detection threshold voltage by a comparator (CMP), and the comparison result is latched by a latch circuit (LT). Then, the result of the ejection detection determination from the ejection detection circuit 236 is outputted as an output signal tk_out200 from the electrodes 141 through an output buffer 239 of the communication circuit output unit 143.

The analog output selection circuit 147 selects a single desired diode from among the 12 diodes being the diodes A0 to A3_105, the diodes B0 to B3_110, and the diodes C0 to C3_115 with a diode selection circuit 237. The analog voltage at the selected diode is inputted into the digital temperature detection PAD unit circuit 150 of a digital temperature detection circuit 238 and subjected to analog-to-digital conversion by an analog-digital converter (ADC). The digital output from the digital temperature detection PAD unit circuit 150 is outputted as an output signal ad_out201 from the electrodes 141 through an output buffer 240 of the communication circuit output unit 143.

Figure 5:
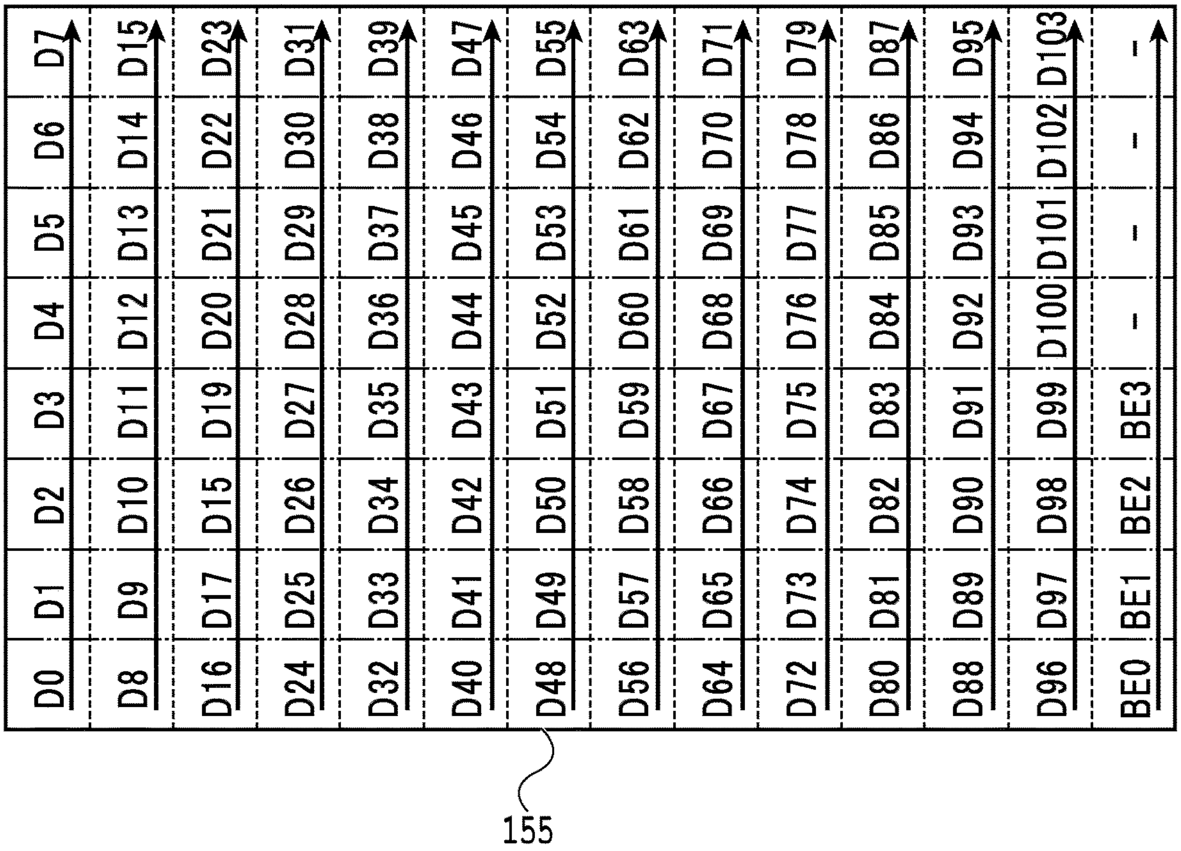
FIG. 5 is a diagram illustrating a bit assignment format for C-array heater selection in the communication data format.

FIG. 5 illustrates a bit assignment format for the C-array heater selection in the communication data format. It is the bit assignment of the C-array heater selection 155 in the communication data 157 in the communication data formats illustrated in FIGS. 3A and 3B. The C-array heaters 111 includes 104 bits (13 bytes) representing D0 to D103 indicating simultaneously driven heaters, and 4 bits representing BE0 to BE3 indicating the 16 time division. The bit assignment of the A-array heater selection 153 and the B-array heater selection 154 in the communication data 151 is similar as well.

Figure 6A:
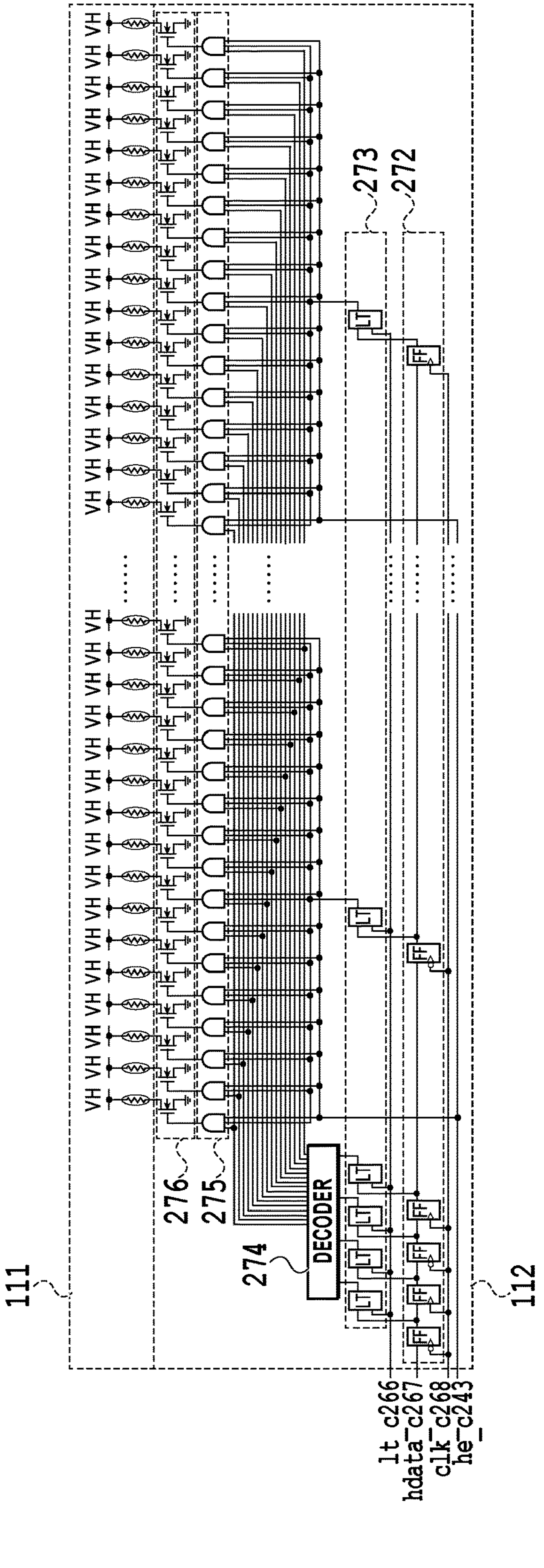
FIG. 6A is a circuit diagram of C-array heaters and a C-array heater selection driving circuit in the head substrate.

FIG. 6A illustrates the C-array heaters and the C-array heater selection driving circuit in the head substrate. FIG. 6A is a circuit diagram of the C-array heaters 111 and the C-array heater selection driving circuit 112 in the head substrate 100 illustrated in FIG. 4B. Here, col_c248 sent from the data1 various data sending circuit 224 of the data1 control circuit 222 includes lt_c266, hdata_c267, and clk_c268. Moreover, col_c248 is inputted into the C-array heater selection driving circuit 112 along with he_c243 sent from the C-array heat pulse generation circuit 232 of the heat pulse generation circuit 145.

Here, hdata_c267 is inputted into FlipFlops (FFs) 272 in synchronization with clk_c268. With lt_c266, the outputs of the FFs 272 are latched in LTs 273. Logical products of the output from a decoder 274 that decodes 4 bits into 16 bits, the LTs 273, and he_c243 are outputted from AND circuits (ANDs) 275. The outputs of the ANDs 275 turn on the gates of NMOS transistors (NMOSs) 276, thereby causing a current to flow into desired heaters among the C-array heaters 111. The A-array heater selection driving circuit 102 and the A-array heaters 101, and the B-array heater selection driving circuit 107 and the B-array heaters 106 have similar configurations as well.

Figure 6B:
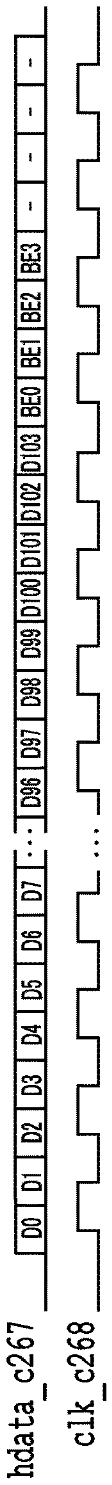
FIG. 6B is a timing chart of the C-array heaters and the C-array heater selection driving circuit in the head substrate.

FIG. 6B is a chart illustrating timing of inputting the bit assignment data of the C-array heater selection 155 illustrated in FIG. 5 into the circuit illustrated in FIG. 6A. In synchronization with clk_c268, hdata_c267 is input such that D0, D1, D2, D3, . . . D101, D102, D103, BE0, BE1, BE2, and BE3 are sequentially taken into the FFs 272. The input timing is similar for the A-array heaters 101 and the B-array heaters 106 as well.

Figure 7:
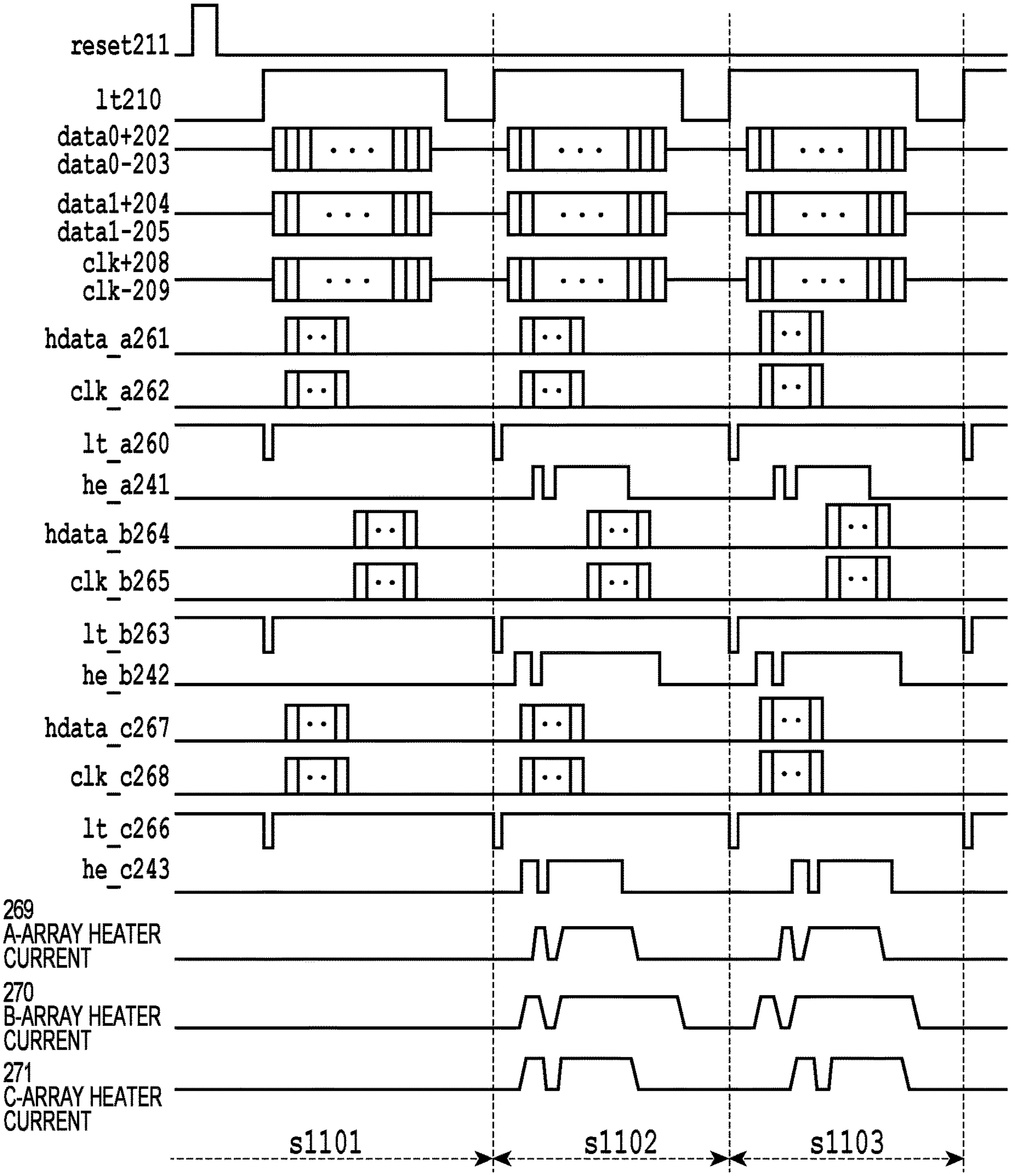
FIG. 7 is a sequence chart of heater driving in the head substrate according to the first embodiment.

FIG. 7 is a sequence chart of heater driving in the head substrate according to the first embodiment. Here, col_a246 sent from the data0 various data sending circuit 220 of the data control circuit 218 includes lt_a260, hdata_a261, and clk_a262. Also, col_b247 includes lt_b263, hdata_b264, and clk_b265. Moreover, col_c248 sent from the data1 various data sending circuit 224 of the data1 control circuit 222 includes lt_c266, hdata_c267, and clk_c268. Note that lt_a260, lt_b263, and lt_c266 each generate a pulse signal in response to detecting rise of lt210. An A-array heater current 269 represents the current flowing through the A-array heaters 101. A B-array heater current 270 represents the current flowing through the B-array heaters 106. A C-array heater current 271 represents the current flowing through the C-array heaters 111.

In sequence s1101, initialization is performed in response to a high input into reset211. Then, information on the A-array heaters and the B-array heaters to be driven is set in the communication data 151 and is inputted into the control circuit 144 from data0+202 and data0−203. Information on the C-array heaters to be driven is set in the communication data 157 and is inputted into the control circuit 144 from data1+204 and data1−205. Similarly, information on each array's heat pulse setting, the sub-heater selection, the analog output selection, the digital output selection, the ejection detection sensor selection, the various ejection detection settings, and the various digital temperature detection settings is set in the communication data 157 and is inputted into the control circuit 144.

The data of the A-array heater selection 153 and a clock are outputted to hdata_a261 and clk_a262. The data of the B-array heater selection 154 and a clock are outputted to hdata_b264 and clk_b265. The data of the C-array heater selection 155 and a clock are outputted to hdata_c267 and clk_c268. The pieces of information on the A-array heaters, the B-array heaters, and the C-array heaters are sent to the A-array heater selection driving circuit 102, the B-array heater selection driving circuit 107, and the C-array heater selection driving circuit 112 via col_a246, col_b247, and col_c248, respectively.

In sequence s1102, hdata_a261, hdata_b264, and hdata_c267 are is inputted into the A-array heater selection driving circuit 102, the B-array heater selection driving circuit 107, and the C-array heater selection driving circuit 112, respectively. Moreover, the heat pulse signals he_a241, he_b242, and he_c243 are generated in the A-array heat pulse generation circuit 230, the B-array heat pulse generation circuit 231, and the C-array heat pulse generation circuit 232 and are outputted to the driving circuits, respectively. The driving circuits load the bit assignment data illustrated in FIG. 5 and drive the A-array heaters 101, the B-array heaters 106, and the C-array heaters 111 in accordance with he_a241, he_b242, and he_c243, respectively. Specifically, the A-array heater current 269, the B-array heater current 270, and the C-array heater current 271 flow through the heaters designated in sequence s1101.

Similarly, in sequence s1103, the A-array heater current 269, the B-array heater current 270, and the C-array heater current 271 flow through the heaters designated in sequence s1102. Subsequently, the above is repeated by following the sequence of ejecting the liquids including inks.

As described above, the communication data format is divided into communication data including selection of heaters in plural heater arrays and communication data including selection of heaters in a single heater array, and various setting data are included in the latter communication data. In this way, the communication data includes a smaller number of pieces of data than the number of heater arrays, thereby allowing a reduction in the number of data input terminals. Accordingly, the number of input circuits is reduced, thereby lowering the current to be consumed and also allowing reductions in the sizes of the substrate of the inkjet print head, an electric wiring board, and flexible cables. Moreover, the number of sealing regions is prevented from increasing due to an increase in the number of electrodes, thereby improving reliability. Hence, the number of data input terminals on the substrate is prevented from increasing even in a case where the number of heater arrays in the inkjet print head increases.

Second Embodiment

Figure 8:
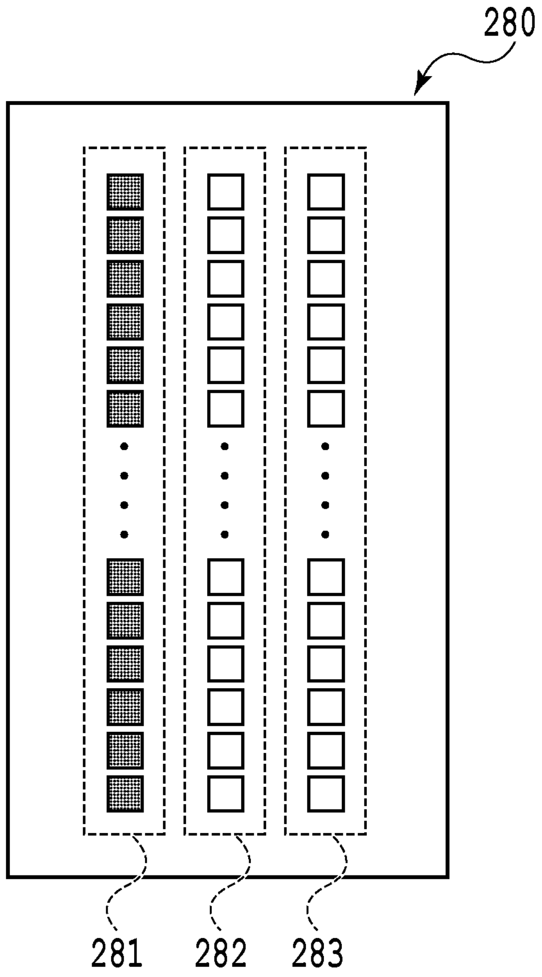
FIG. 8 is a diagram illustrating color assignment of each array in an inkjet print head as liquid ejection heads according to a second embodiment of the present disclosure.

FIG. 8 illustrates color assignment of each array in an inkjet print head as liquid ejection heads according to a second embodiment of the present disclosure. An inkjet print head 280 uses a single color of black 281 (reference numerals 282 and 283 represent no color used). Plural liquid ejection heads that eject a liquid including an ink are disposed in an array. The head substrate in the second embodiment is the same as the head substrate 100 in the first embodiment illustrated in FIGS. 2A and 2B. In the second embodiment, the liquid ejection heads for the black 281 are assigned to the C-array heaters 111.

Figure 9:
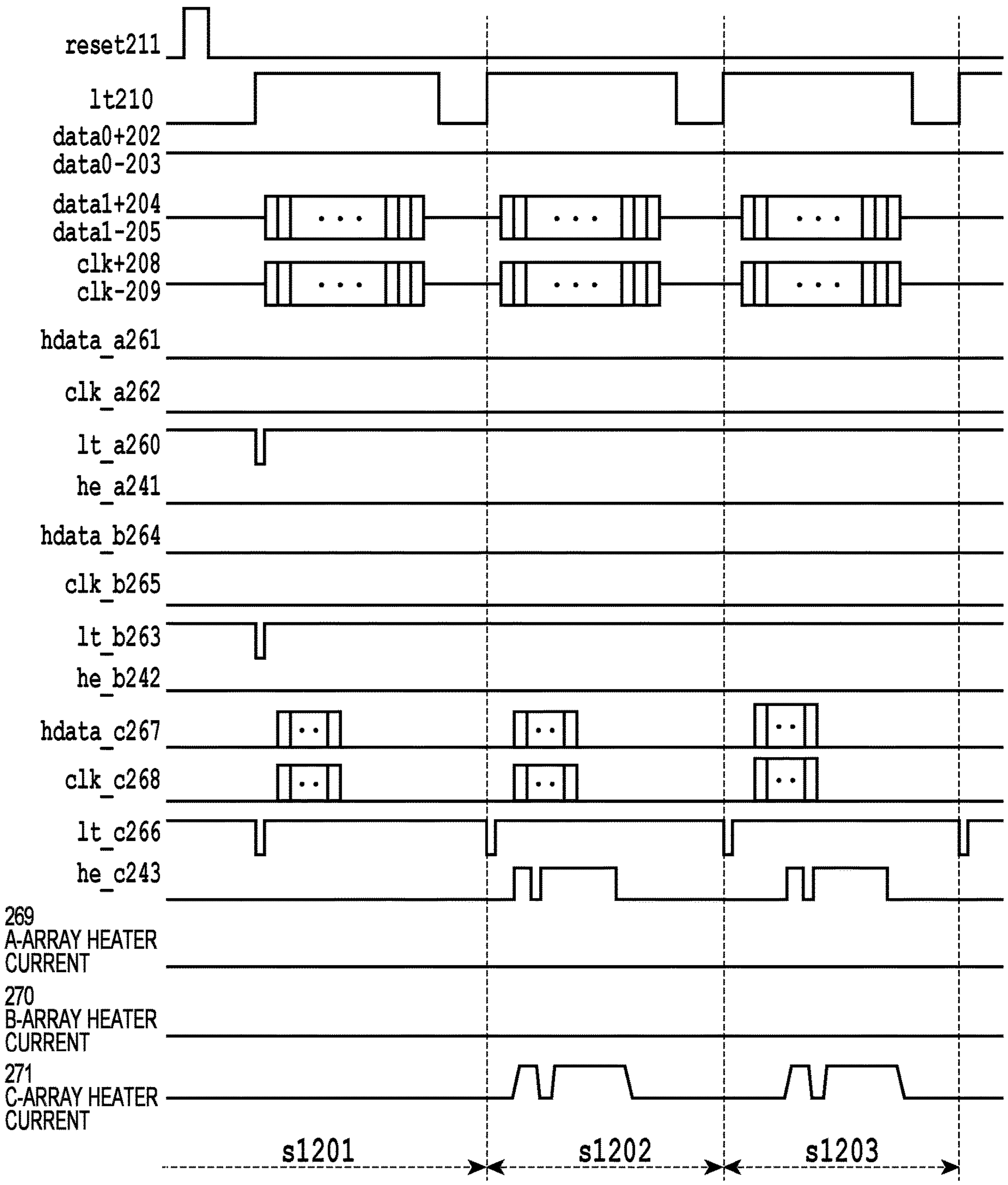
FIG. 9 is a sequence chart of heater driving in a head substrate according to the second embodiment.

FIG. 9 is a sequence chart of heater driving in the head substrate according to the second embodiment. The block configurations of the head substrate in the second embodiment is the same as the block configurations of the head substrate 100 in the first embodiment illustrated in FIGS. 4A, 4B and 4C. The second embodiment differs in that the A-array heaters 101 and the B-array heaters 106 are not used, and the communication data 151 is not needed in the communication data formats in the first embodiment illustrated in FIGS. 3A and 3B. Differences will be described below.

In sequence s1201, data0+202 and data0−203 remain unchanged from the initial state. Information on the C-array heaters to be driven is set in the communication data 157 and is inputted into the control circuit 144 from data1+204 and data1−205. Similarly, information on the C array's heat pulse setting, the C array's sub-heater selection, the analog output selection, the digital output selection, the ejection detection sensor selection, the various ejection detection settings, and the various digital temperature detection settings is set in the communication data 157 and is inputted into the control circuit 144.

The data of the C-array heater selection 155 and a clock are outputted to hdata_c267 and clk_c268. Information on the C-array heaters is sent to the C-array heater selection driving circuit 112 via col_c248. On the other hand, data0+202 and data0−203 remain in the initial state, and therefore hdata_a261, hdata_b264, clk_a262, and clk_b265 remain unchanged as well.

In sequence s1202, hdata_c267 is inputted into the C-array heater selection driving circuit 112, and the heat pulse signal be_c243 is inputted from the C-array heat pulse generation circuit 232. The C-array heater selection driving circuit 112 loads the bit assignment data and drives the C-array heaters 111 in accordance with he_c243. Specifically, the C-array heater current 271 flows through the heaters designated in sequence s1201. On the other hand, data0+202 and data0−203 remain in the initial state, and therefore lt_a260 and lt_b263 do not generate pulses. Also, since the A-array heat pulse generation circuit 230 and the B-array heat pulse generation circuit 231 do not generate the heat pulse signals he_a241 and he_b242, the A-array heater current 269 and the B-array heater current 270 do not flow.

Similarly, in sequence s1203, the C-array heater current 271 flows through the heaters designated in sequence s1202. Subsequently, the above is repeated by following the sequence of ejecting the liquid including an ink.

No heater is selected for the A-array heater selection driving circuit 102 or the B-array heater selection driving circuit 107. For this reason, the heat pulse signals for the A array and the B array may be outputted.

With such a configuration, the head substrate of the inkjet print head including heaters for three colors, i.e., three arrays of heaters, can also be used for an inkjet print head using only one color of black. In this case, it suffices that the data input terminals data1+204 and data1−205 in the block configurations of the head substrate in the first embodiment illustrated in FIGS. 4A, 4B and 4C are included. This allows diversion of the head substrate while also reducing the number of data input terminals.

Third Embodiment

Figure 10:
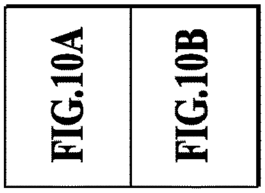
FIG. 10 is a diagram showing the relationship of FIGS. 10A and 10B, and FIGS. 10A and 10B are front surface diagrams illustrating a head substrate in an inkjet print head according to a third embodiment of the present disclosure.
Figure 10A:
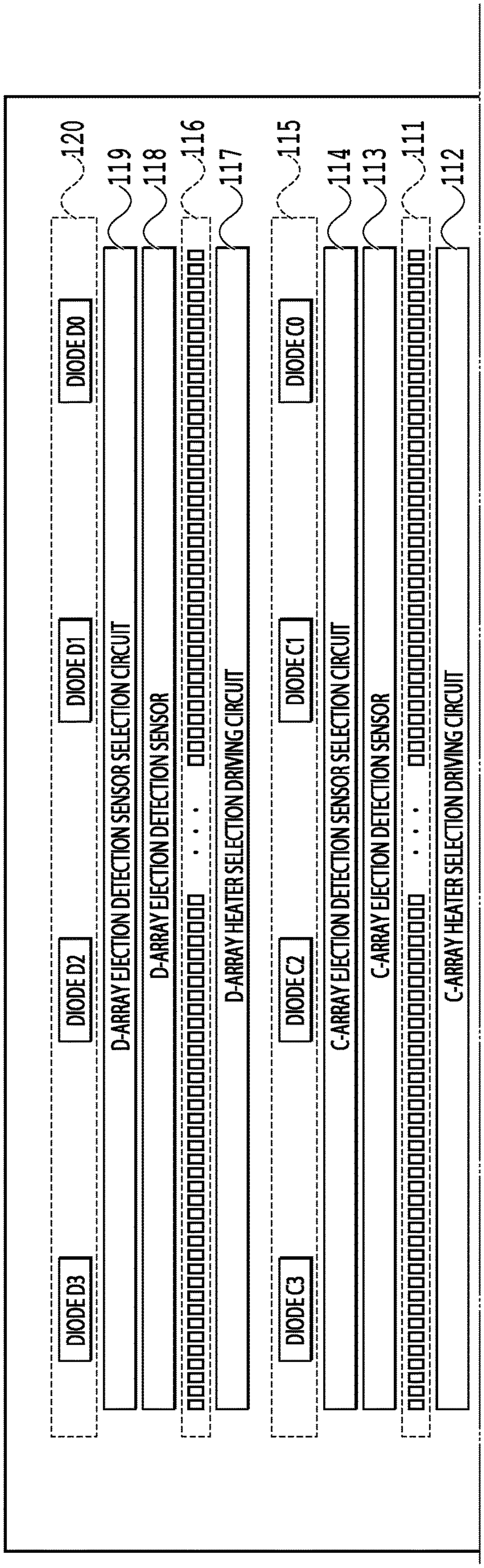
Figure 10B:
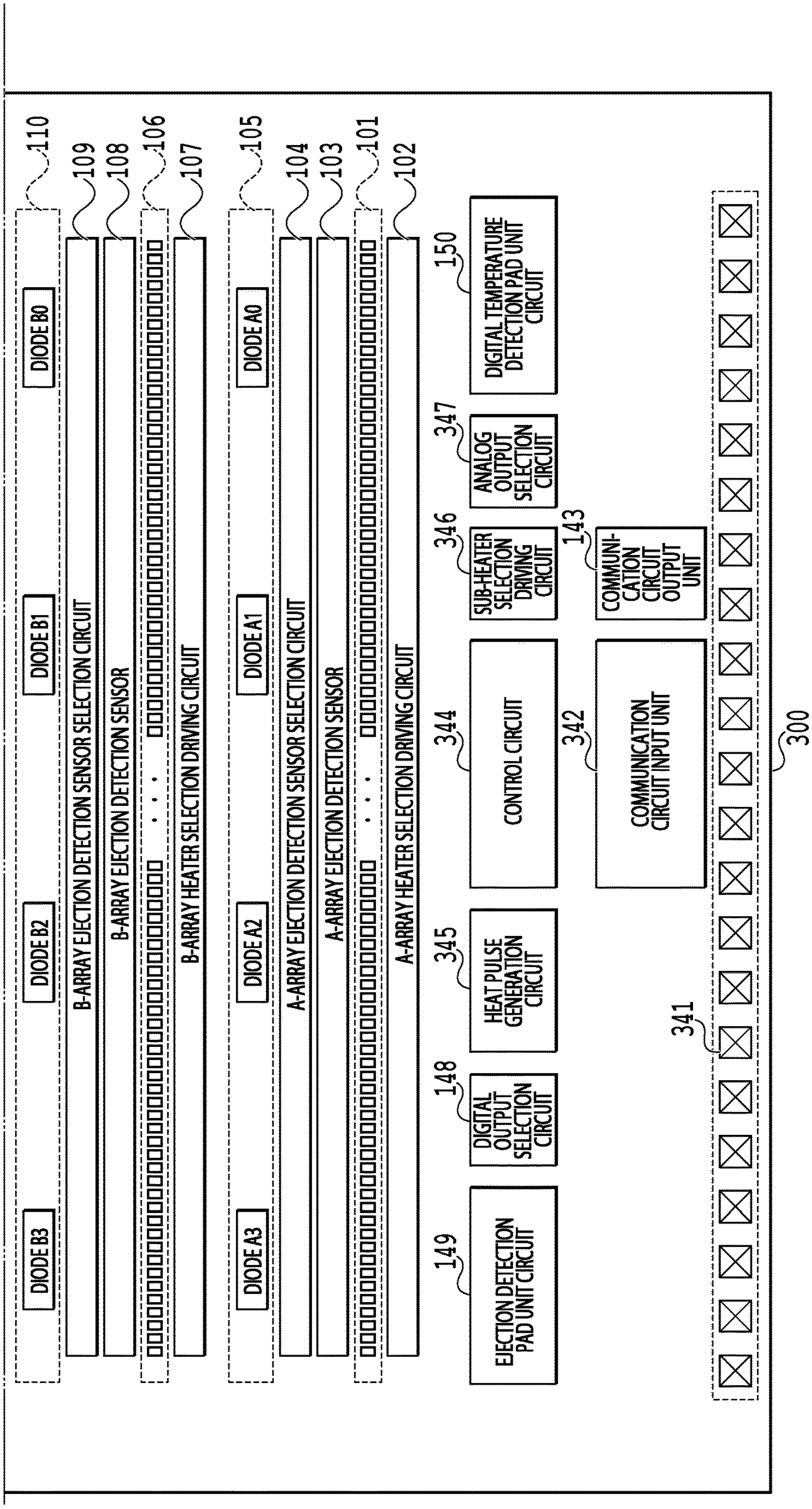

FIGS. 10A and 10B illustrate a head substrate in an inkjet print head according to a third embodiment of the present disclosure. A head substrate 300 in the third embodiment is the head substrate 100 in the first embodiment illustrated in FIGS. 2A and 2B additionally including D-array heaters as 1200-dpi liquid ejection heads. D-array heaters 116 are disposed, and a D-array heater selection driving circuit 117 selects desired heaters from the corresponding heater array. D-array ejection detection sensors 118, a D-array ejection detection sensor selection circuit 119, and diodes D0 to D3_120 are additionally included as well. Sub-heaters (not shown) which correspond to the sub-heater diodes D0 to D3_120 are additionally included as well.

Figures 11, 11A:
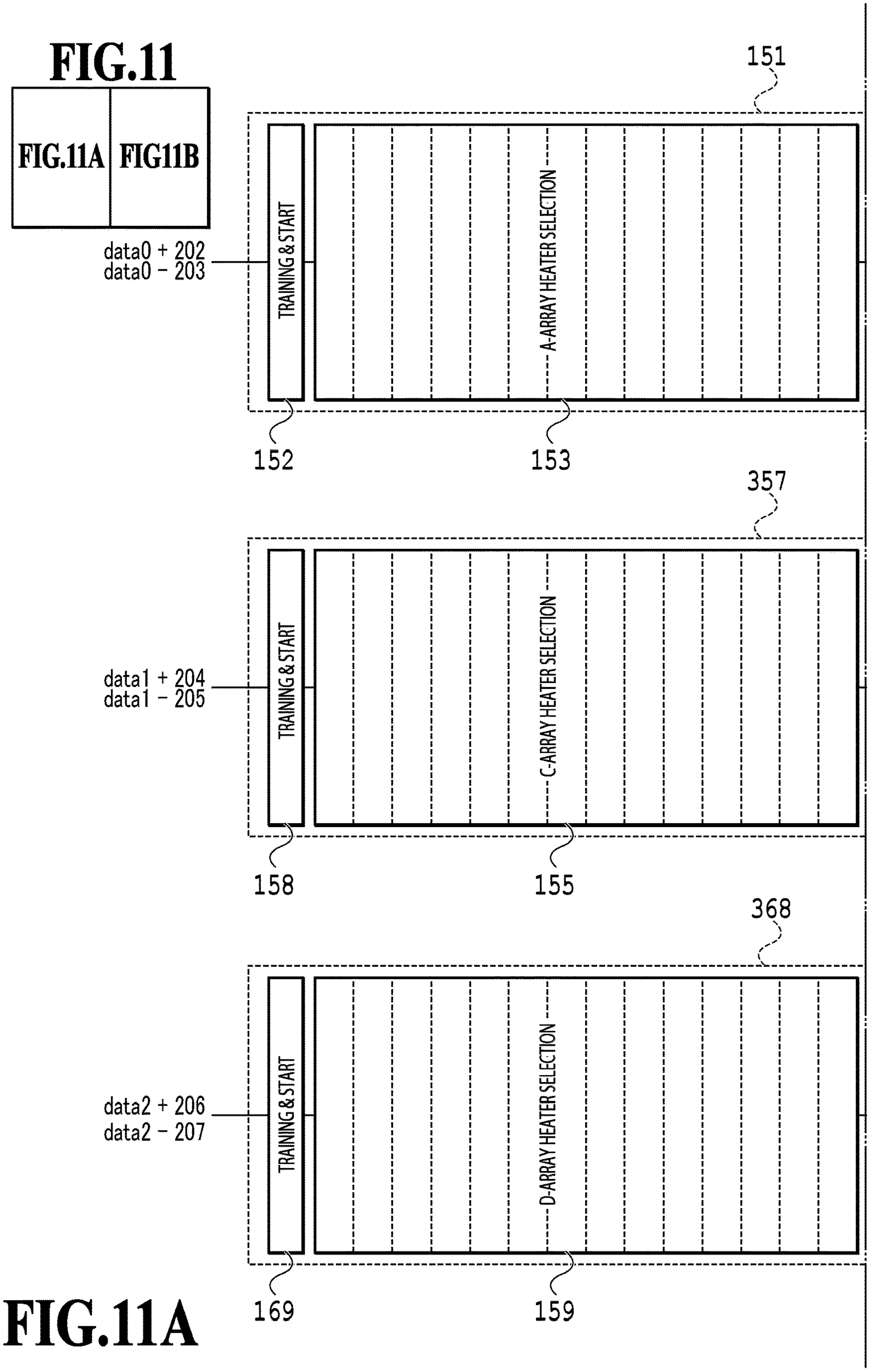
FIG. 11 is a diagram showing the relationship of FIGS. 11A and 11B, and FIGS. 11A and 11B are diagrams illustrating a communication data format for the head substrate according to the third embodiment.
Figure 11B:
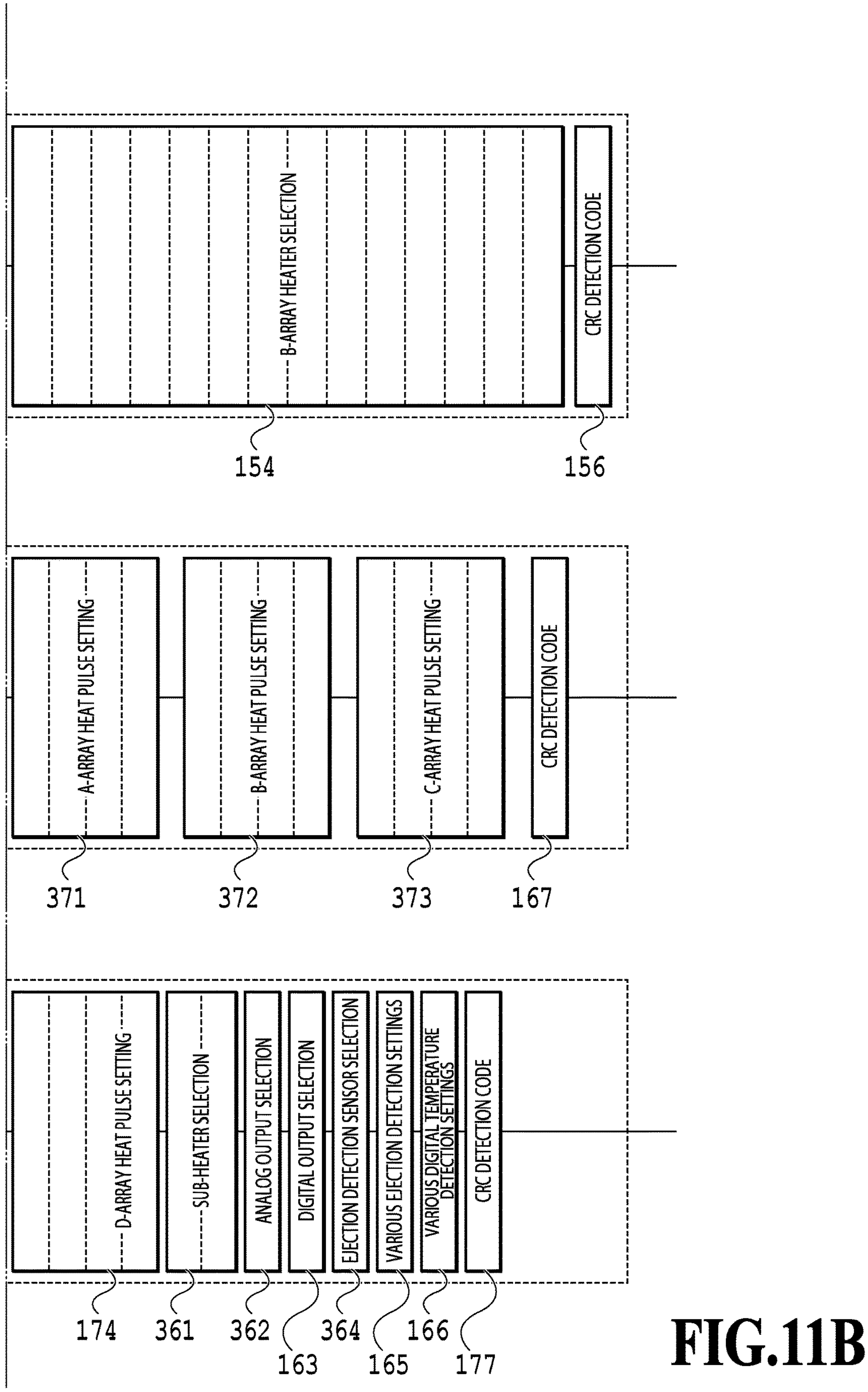

FIGS. 11A and 11B illustrate communication data formats for the head substrate according to the third embodiment. Communication data 151 inputted from data0+202 and data0−203 of electrodes 341 is the same as the communication data 151 in the first embodiment illustrated in FIGS. 3A and 3B. Differences will be described below.

Communication data 357 inputted from data1+204 and data1−205 of the electrodes 341 starts with training & start 158, which is 1 byte. The next C-array heater selection 155, which is 14 bytes, designates desired heaters to be selected by the C-array heater selection driving circuit 112. A-array heat pulse setting 371, which is 4 bytes, designates the driving pulses for the driver (not shown) for the A-array heater selection driving circuit 102. B-array heat pulse setting 372 and C-array heat pulse setting 373, which are 4 bytes, designate the driving pulses for the drivers (not shown) for the B-array heater selection driving circuit 107 and the C-array heater selection driving circuit 112.

The heat pulse generation circuit 145 generates heat pulse signals based on these heat pulse settings. In the first embodiment, each single array is assigned a 2-byte heat pulse setting. In the third embodiment, each single array is assigned 4 bytes to increase the generation patterns of heat pulse signals to be generated. In other words, the heat pulse setting can change the amount of information according to the configuration of the heat pulse generation circuit 145.

Communication data 368 inputted from data2+206 and data2−207 of the electrodes 341 starts with training & start 158, which is 1 byte. The next D-array heater selection 159, which is 14 bytes, designates desired heaters to be selected by the D-array heater selection driving circuit 117. The D-array heaters 116 are also formed of 1664 heaters, and time-division driving is performed with 16 time slots. Thus, the D-array heater selection 159 includes 14 bytes. D-array heat pulse setting 174, which is 4 bytes, designates the driving pulses for the driver (not shown) for the D-array heater selection driving circuit 117.

Sub-heater selection 361, which is 2 bytes, designates sub-heaters to be driven from among the 16 sub-heaters (not shown), which are heating elements. Analog output selection 362 designates one of the diodes A0 to A3_105, the diodes B0 to B3_110, the diodes C0 to C3_115, and diodes D0 to D3_120. Ejection detection sensor selection 364 designates sensors to be selected from among the A-array ejection detection sensors 103, the B-array ejection detection sensors 108, the C-array ejection detection sensors 113, and the D-array ejection detection sensors 118. Digital output selection 163, various ejection detection settings 165, and various digital temperature detection settings 166 are the same as those in the first embodiment. As in the first embodiment, CRC detection code 177, which is 1 byte, is the end of the communication data 368.

Figure 12:
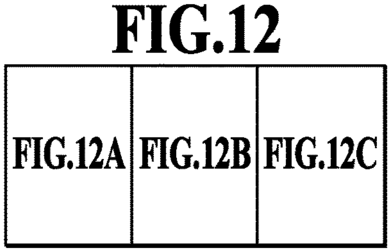
FIG. 12 is a diagram showing the relationship of FIGS. 12A, 12B and 12C, and FIGS. 12A, 12B and 12C are block diagrams of the head substrate according to the third embodiment.
Figure 12A:
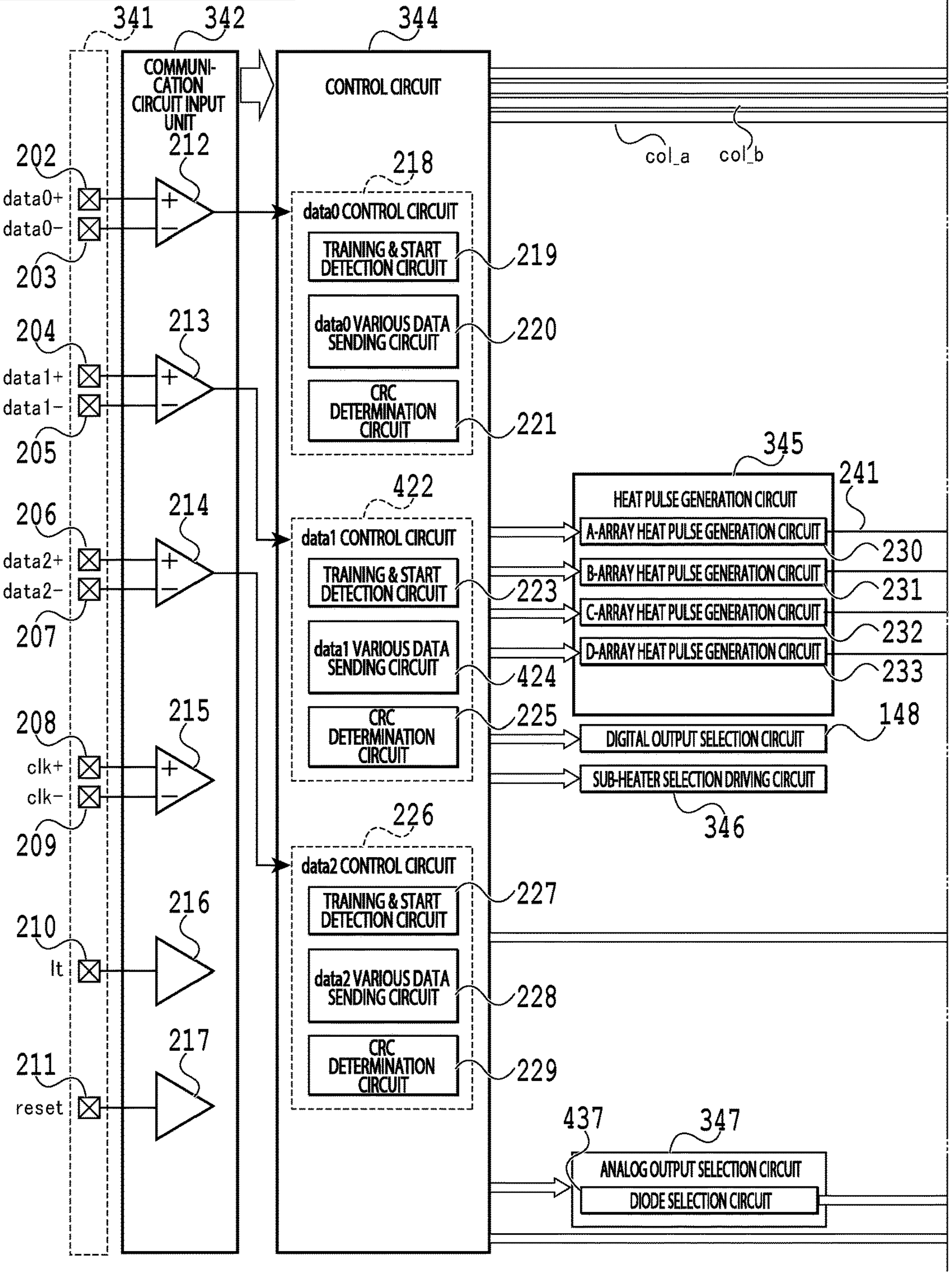
Figure 12B:
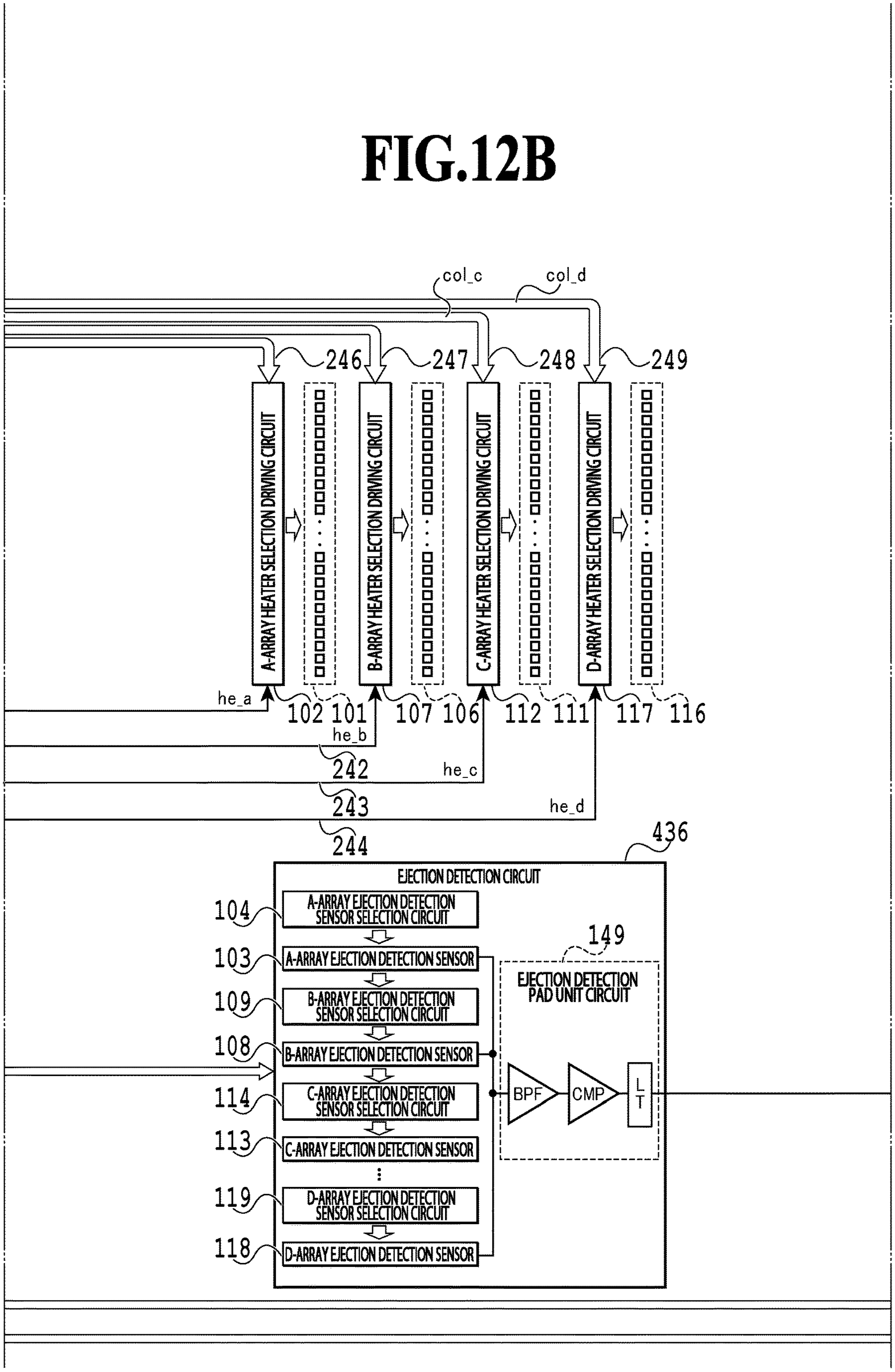
Figure 12C:
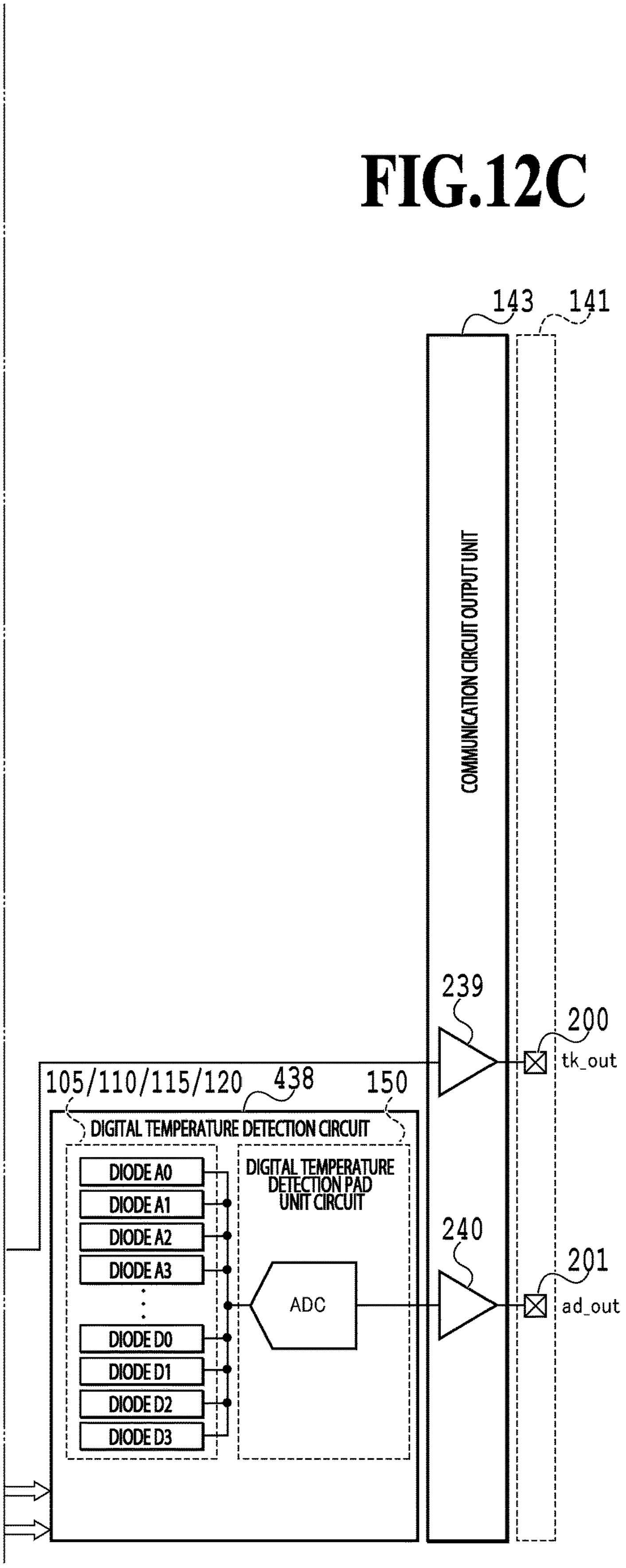

FIGS. 12A, 12B and 12C illustrate block configurations of the head substrate according to the third embodiment. The head substrate in the third embodiment has the block configurations in the first embodiment illustrated in FIGS. 4A, 4B and 4C and additionally includes an LVDS receiver 214 that receives data2+206 and data2−207 in a communication circuit input unit 342. A control circuit 344 has a data1 control circuit 422 that analyzes the communication data 357, and sends the data of the C-array heater selection 155 to the C-array heater selection driving circuit 112 via col_c248 with the data1 various data sending circuit 424. The control circuit 344 sends the data of the A-array heat pulse setting 371 to the A-array heat pulse generation circuit 230 of the heat pulse generation circuit 345 with the data1 various data sending circuit 424. The control circuit 344 sends the data of the B-array heat pulse setting 372 to the B-array heat pulse generation circuit 231 and the data of the C-array heat pulse setting 373 to the C-array heat pulse generation circuit 232 with the data1 various data sending circuit 424.

The control circuit 344 has a data2 control circuit 226 that analyzes the communication data 368, and detects the training & start 169 with a training & start detection circuit 227. Then, the control circuit 344 sends the data of the D-array heater selection 159 to the D-array heater selection driving circuit 117 via col_d249 with a data2 various data sending circuit 228. Moreover, the control circuit 344 sends the data of the D-array heat pulse setting 174 to the D-array heat pulse generation circuit 233 of the heat pulse generation circuit 345 with the data2 various data sending circuit 228. The data2 various data sending circuit 228 sends the data of the sub-heater selection 361 to the sub-heater selection driving circuit 346, and sends the data of the analog output selection 362 to an analog output selection circuit 347. The data2 various data sending circuit 228 sends the data of the ejection detection sensor selection 364 to the A-array ejection detection sensor selection circuit 104, the B-array ejection detection sensor selection circuit 109, the C-array ejection detection sensor selection circuit 114, and the D-array ejection detection sensor selection circuit 119. Lastly, a CRC determination circuit 229 determines whether the CRC calculation value of the communication data 368 and the CRC detection code 177 match each other.

A heat pulse signal he_d244 generated by the D-array heat pulse generation circuit 233 is outputted to the D-array heater selection driving circuit 117. As with the A, B and C arrays, the D-array ejection detection sensor selection circuit 119 selects a single desired sensor from among the D-array ejection detection sensors 118, and the result of ejection detection determination is outputted from an ejection detection circuit 436. The output voltage from the D-array ejection detection sensor 118 is inputted into the ejection detection PAD unit circuit 149, and the result of the ejection detection determination from the ejection detection circuit 436 is outputted together with the determination results for the A, B and C arrays.

The analog output selection circuit 347 selects a single desired diode from among the 16 diodes being the diodes for the A, B, and C arrays as well as the diodes D0 to D3_120 for the D array with a diode selection circuit 437. The analog voltage at the selected diode is subjected to digital conversion by a digital temperature detection circuit 438 and is outputted as the output signal ad_out201 from the electrodes 141 through the output buffer 240 of the communication circuit output unit 143.

As described above, the communication data format is divided into a piece of communication data including selection of heaters in plural heater arrays and plural pieces of communication data each including selection of heaters in a single heater array, and various setting data are included in the latter pieces of communication data. In this way, the communication data includes a smaller number of pieces of data than the number of heater arrays, thereby allowing a reduction in the number of data input terminals. Accordingly, the number of input circuits is reduced, thereby lowering the current to be consumed and also allowing reductions in the sizes of the substrate of the inkjet print head, an electric wiring board, and flexible cables. Moreover, the number of sealing regions is prevented from increasing due to an increase in the number of electrodes, thereby improving reliability.

Fourth Embodiment

Figure 13:
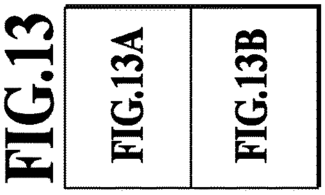
FIG. 13 is a diagram showing the relationship of FIGS. 13A and 13B, and FIGS. 13A and 13B are front surface diagrams illustrating a head substrate in an inkjet print head according to a fourth embodiment of the present disclosure.
Figure 13A:
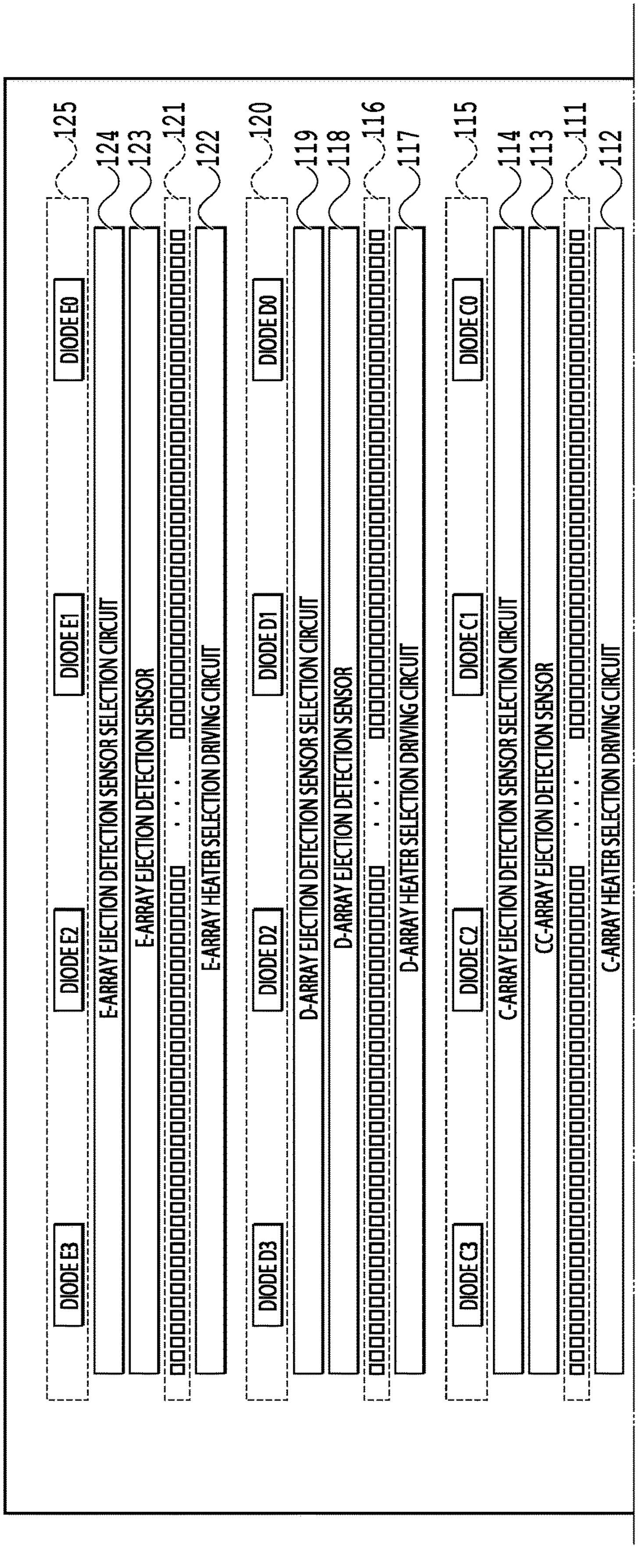
Figure 13B:
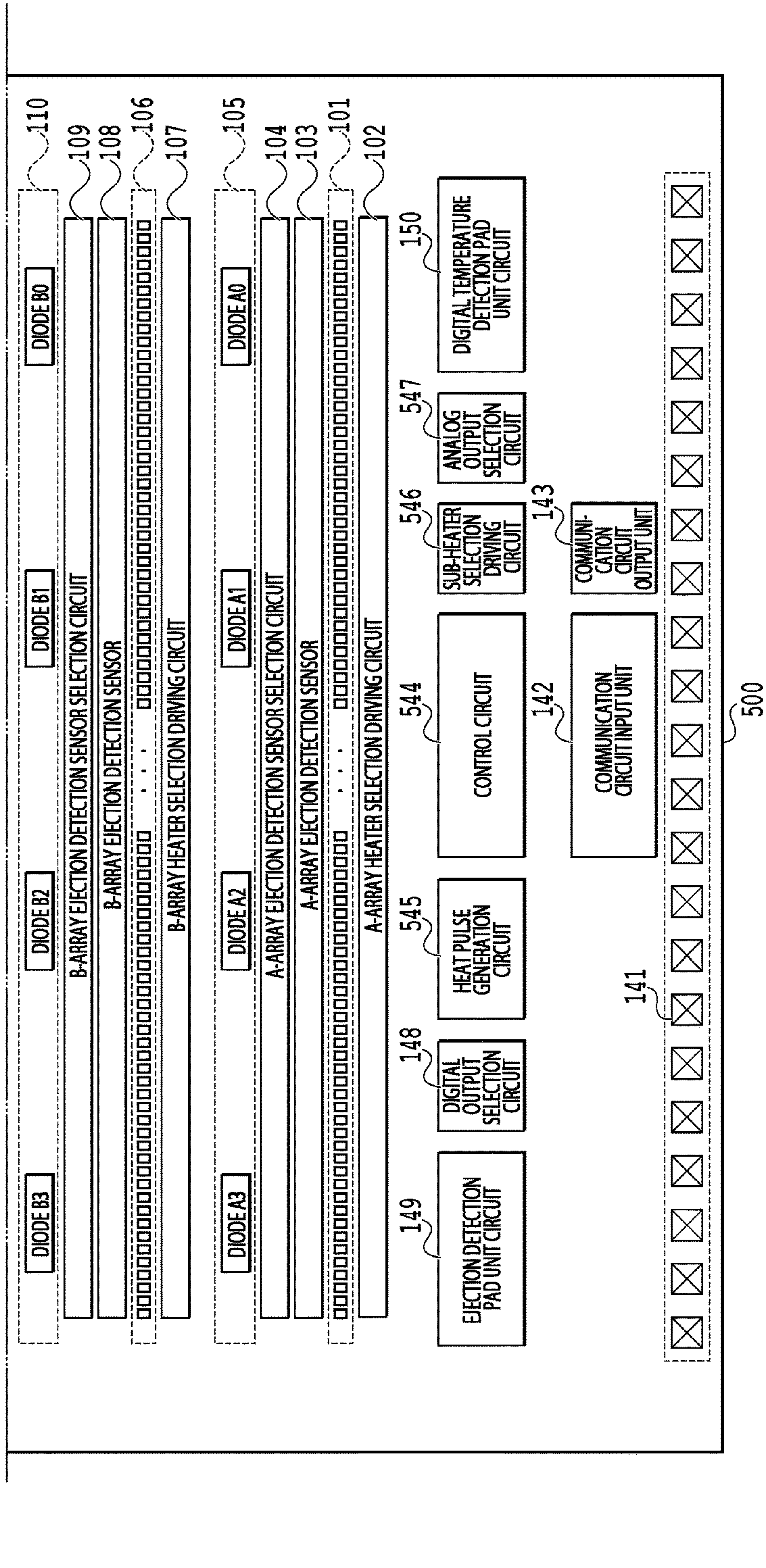

FIGS. 13A and 13B illustrate a head substrate in an inkjet print head according to a fourth embodiment of the present disclosure. A head substrate 500 in the fourth embodiment is the head substrate 300 in the third embodiment illustrated in FIGS. 10A and 10B additionally including E-array heaters as 1200-dpi liquid ejection heads. E-array heaters 121 are disposed, and an E-array heater selection driving circuit 122 selects desired heaters from the corresponding heater array. E-array ejection detection sensors 123, an E-array ejection detection sensor selection circuit 124, and diodes E0 to E3_125 are additionally included as well. Sub-heaters (not shown) which correspond to the sub-heater diodes E0 to E3_125 are additionally included as well.

Figures 14, 14A:
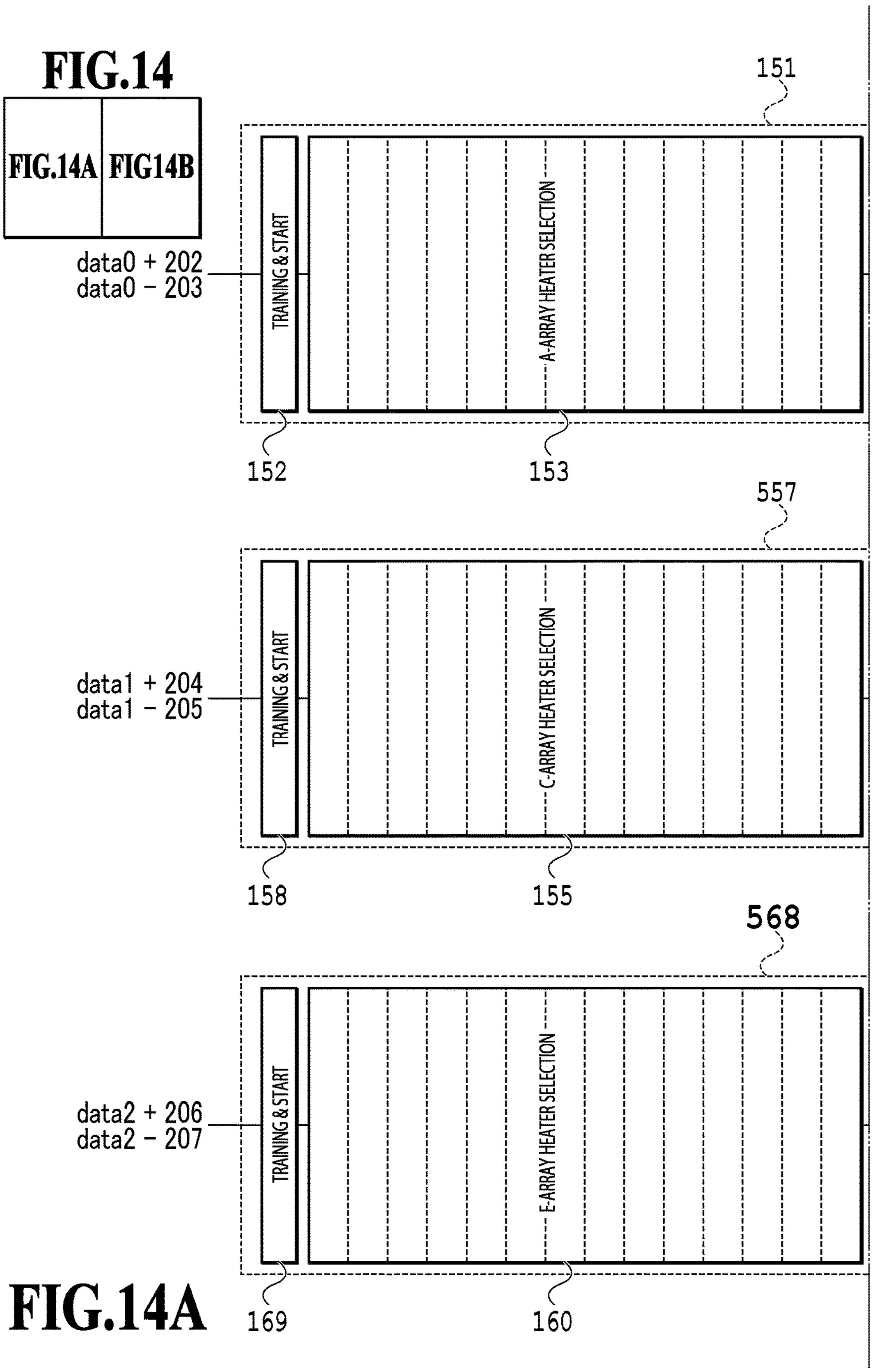
FIG. 14 is a diagram showing the relationship of FIGS. 14A and 14B, and FIGS. 14A and 14B are diagrams illustrating a communication data format for the head substrate according to the fourth embodiment.
Figure 14B:
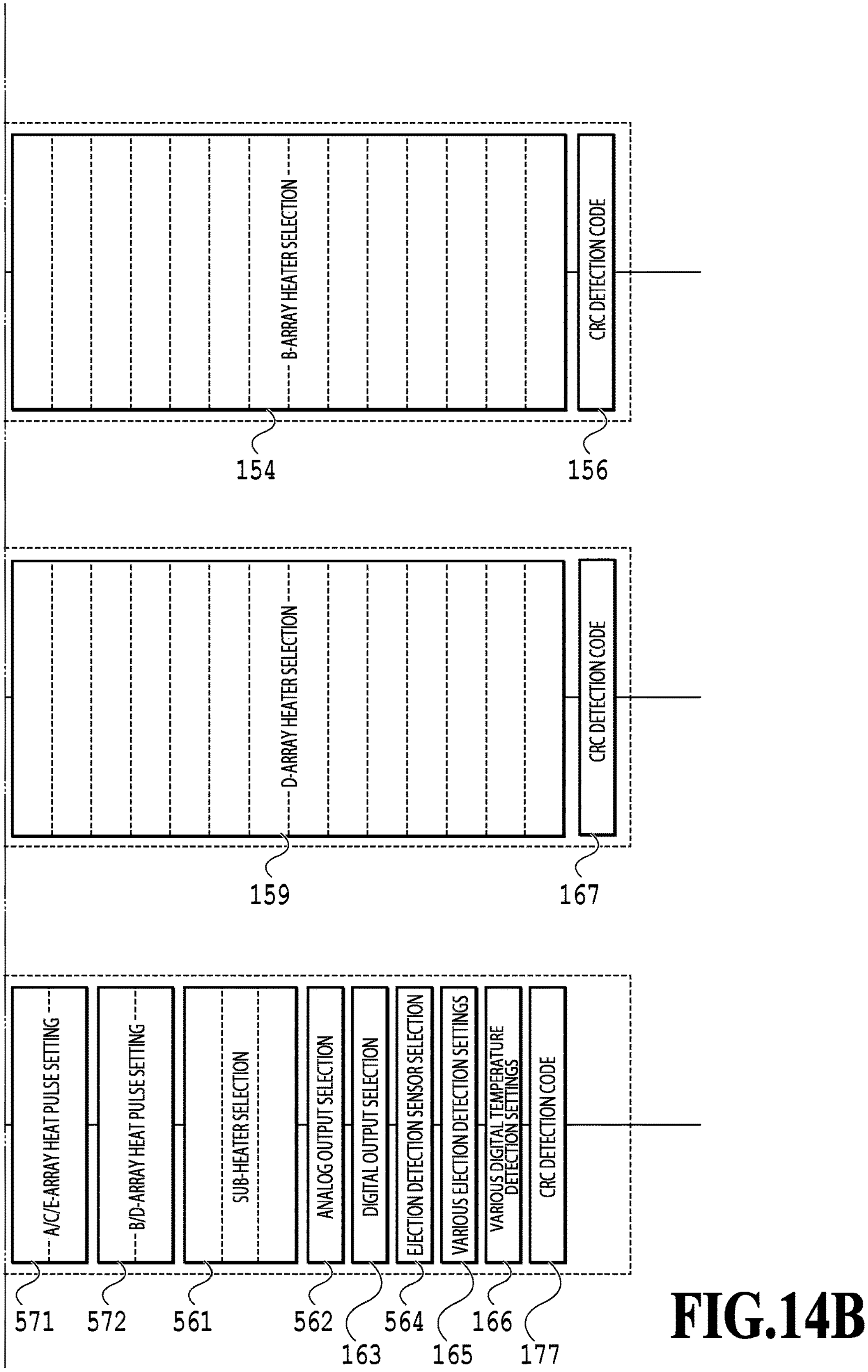

FIGS. 14A and 14B illustrates communication data formats for the head substrate according to the fourth embodiment. Communication data 151 inputted from data0+202 and data0−203 of electrodes 341 is the same as the communication data 151 in the third embodiment illustrated in FIGS. 11A and 11B. Differences will be described below.

Communication data 557 inputted from data1+204 and data1−205 of the electrodes 341 starts with training & start 158, which is 1 byte. The next C-array heater selection 155, which is 14 bytes, designates desired heaters to be selected by the C-array heater selection driving circuit 112. D-array heater selection 159, which is 14 bytes, designates desired heaters to be selected by the D-array heater selection driving circuit 117. CRC detection code 167, which is 1 byte, designates a CRC calculation value of the C-array heater selection 155 and the D-array heater selection 159, and the communication data 557 ends.

Communication data 568 inputted from data2+206 and data2−207 of the electrodes 341 starts with training & start 169, which is 1 byte. The next E-array heater selection 160, which is 14 bytes, designates desired heaters to be selected by the E-array heater selection driving circuit 122. The E-array heaters 121 are also formed of 1664 heaters, and time-division driving is performed with 16 time slots. Thus, the E-array heater selection 160 includes 14 bytes. A/C/E-array heat pulse setting 571, which is 2 bytes, designates the driving pulses for the drivers (not shown) for the A-array heater selection driving circuit 102, the C-array heater selection driving circuit 112, and the E-array heater selection driving circuit 122. B/D-array heat pulse setting 572, which is 2 bytes, designates the driving pulses for the driver (not shown) for the B-array heater selection driving circuit 107 and the D-array heater selection driving circuit 117. As mentioned above, these heat pulse settings can change the amount of information according to the configuration of a heat pulse generation circuit 545.

Sub-heater selection 561, which is 3 bytes, designates sub-heaters to be driven from among the 20 sub-heaters (not shown), which are heating elements. Analog output selection 562 designates one of the diodes A0 to A3_105, the diodes B0 to B3_110, the diodes C0 to C3_115, the diode D0 to D3_120, and the diode E0 to E3_125. Ejection detection sensor selection 564 designates sensors to be selected from among the A-array ejection detection sensors 103, the B-array ejection detection sensors 108, the C-array ejection detection sensors 113, the D-array ejection detection sensors 118, and the E-array ejection detection sensors 123. Digital output selection 163, various ejection detection settings 165, and various digital temperature detection settings 166 are the same as those in the third embodiment. As in the third embodiment, CRC detection code 177, which is 1 byte, is the end of the communication data 568.

Figures 15, 15A:
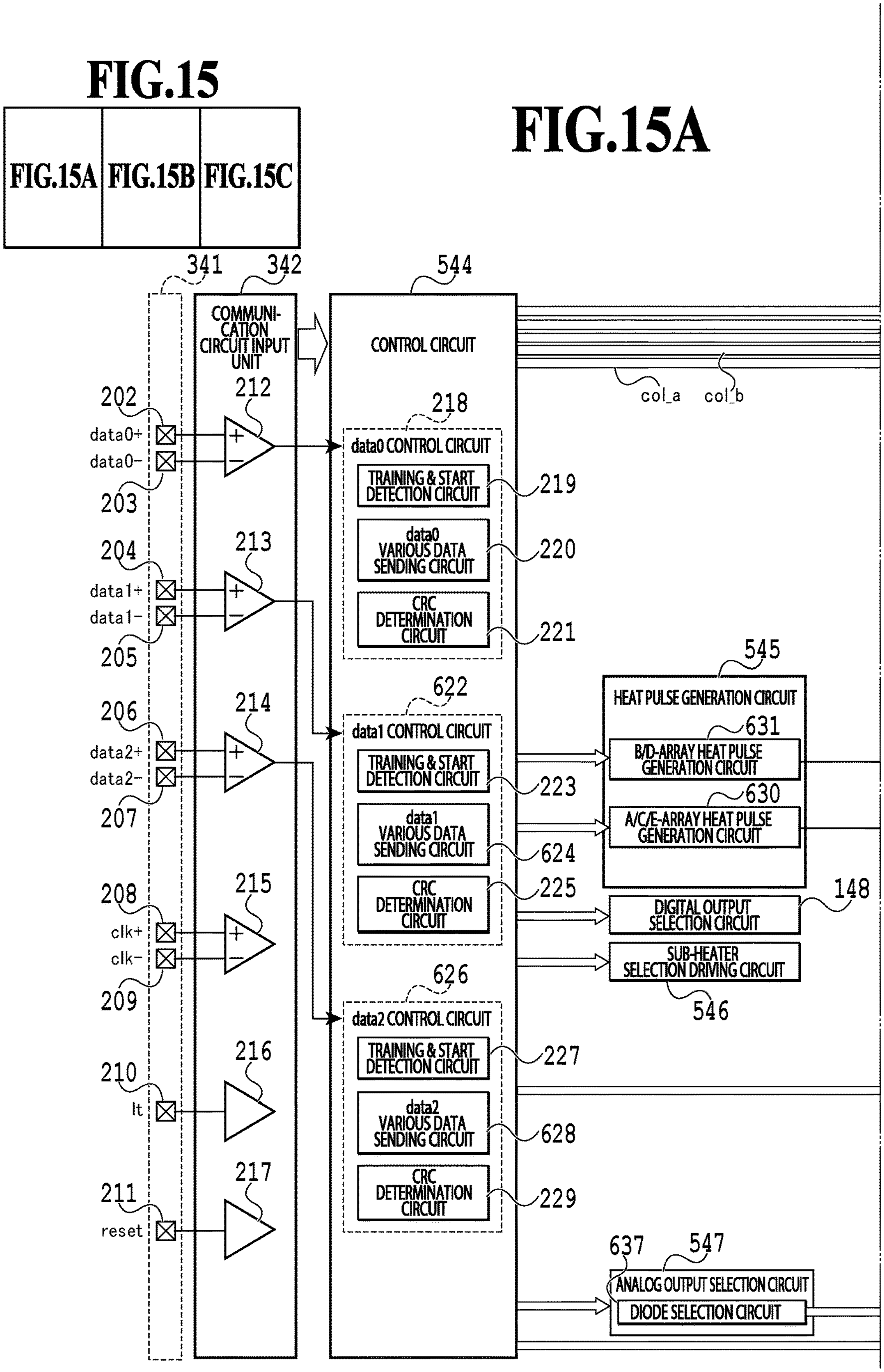
FIG. 15 is a diagram showing the relationship of FIGS. 15A, 15B and 15C, and FIGS. 15A, 15B and 15C are block diagrams of the head substrate according to the fourth embodiment.
Figure 15B:
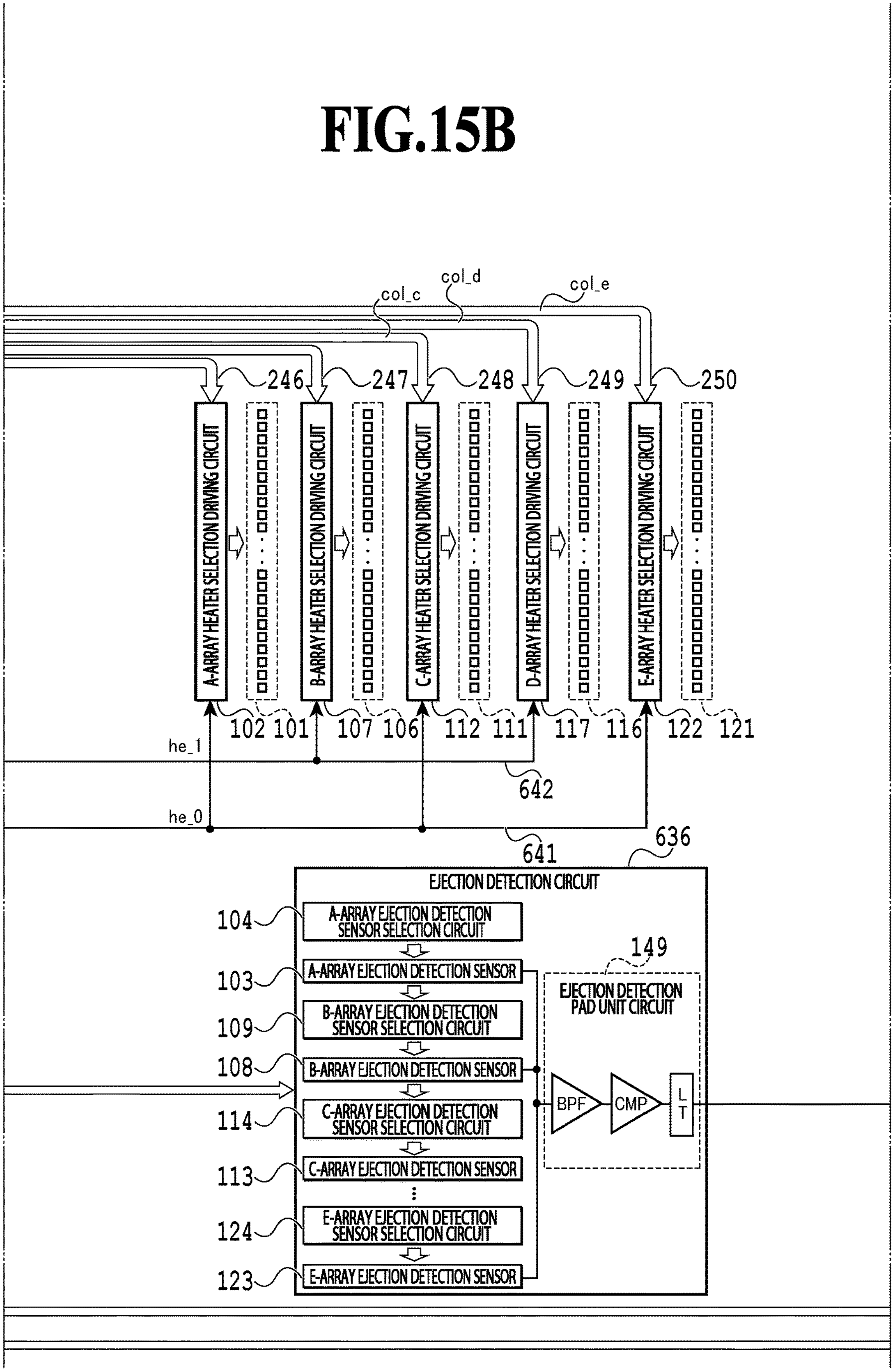
Figure 15C:
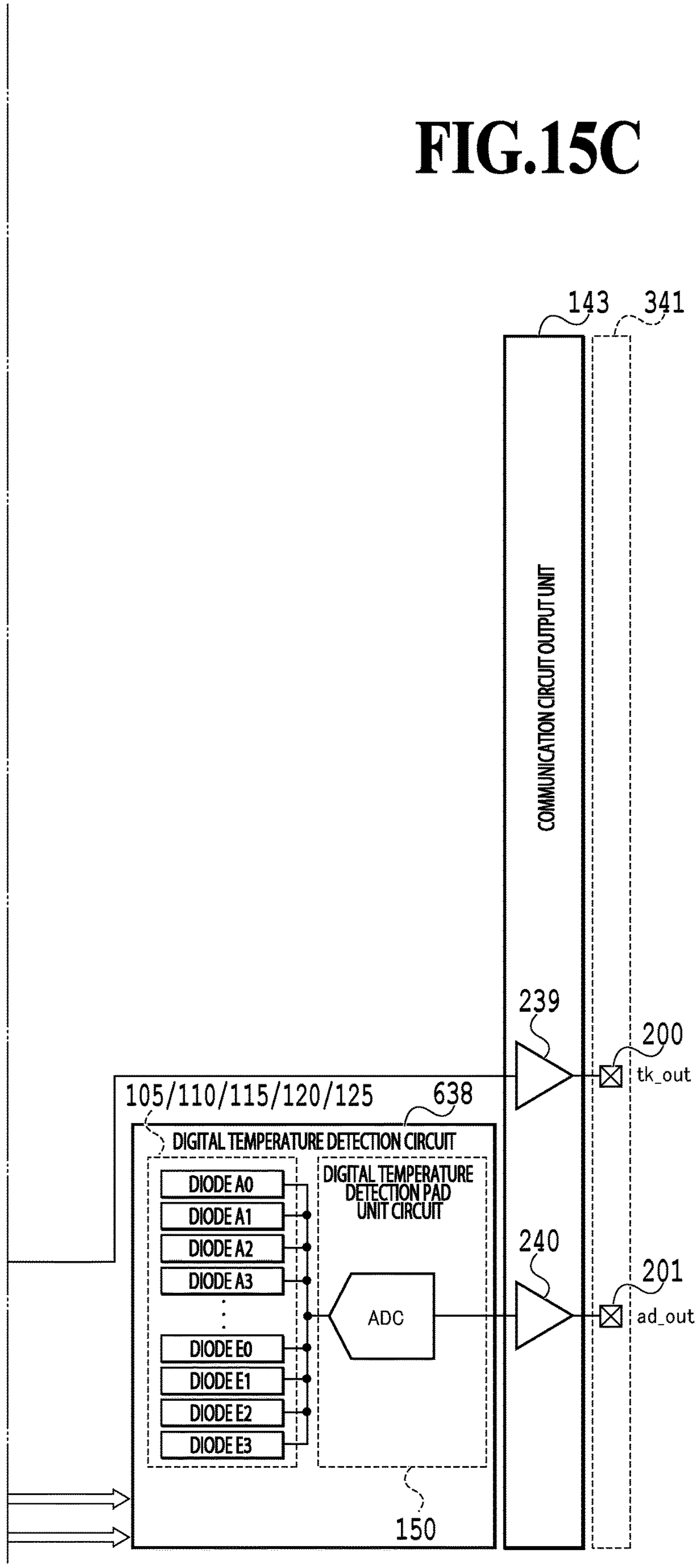

FIGS. 15A. 15B and 15C illustrate block configurations of the head substrate according to the fourth embodiment. As with the head substrate in the third embodiment illustrated in FIGS. 12A, 12B and 12C, the head substrate in the fourth embodiment includes the electrodes 341 and the communication circuit input unit 342.

A control circuit 544 has a data1 control circuit 622 that analyzes the communication data 557, and sends the data of the C-array heater selection 155 to the C-array heater selection driving circuit 112 via col_c248 with a data1 various data sending circuit 624. The data1 various data sending circuit 624 also sends the data of the D-array heater selection 159 to the D-array heater selection driving circuit 117 via col_d249.

The control circuit 544 has a data2 control circuit 626 that analyzes the communication data 568, and sends the data of the E-array heater selection 160 to the E-array heater selection driving circuit 122 via col_e250 with a data2 various data sending circuit 628. The data2 various data sending circuit 628 sends the data of the A/C/E-array heat pulse setting 571 to an A/C/E-array heat pulse generation circuit 630 of the heat pulse generation circuit 545, and sends the data of the B/D-array heat pulse setting 572 to a B/D-array heat pulse generation circuit 631. The data2 various data sending circuit 628 sends the data of the sub-heater selection 561 to a sub-heater selection driving circuit 546, and sends the data of the analog output selection 562 to an analog output selection circuit 547. As with the A, B, C and D arrays, the data2 various data sending circuit 628 sends the data of the ejection detection sensor selection 564 to an E-array ejection detection sensor selection circuit 124.

A heat pulse signal he_0_641 generated by the A/C/E-array heat pulse generation circuit 630 is outputted to the A-array heater selection driving circuit 102, the C-array heater selection driving circuit 112, and the E-array heater selection driving circuit 122. A heat pulse signal he_1_642 generated by the B/D-array heat pulse generation circuit 631 is outputted to the B-array heater selection driving circuit 107 and the D-array heater selection driving circuit 117. As with the A, B. C, and D arrays, the E-array ejection detection sensor selection circuit 124 selects a single desired sensor from among the E-array ejection detection sensors 123, and the result of ejection detection determination is outputted from an ejection detection circuit 636.

The analog output selection circuit 547 selects a single desired diode from among the 20 diodes being the diodes for the A, B, C, and D arrays as well as the diodes E0 to E3_125 for the E array with a diode selection circuit 637. The analog voltage at the selected diode is subjected to digital conversion by a digital temperature detection circuit 638 and is outputted as the output signal ad_out201 from the electrodes 141 through the output buffer 240 of the communication circuit output unit 143.

As described above, the communication data format is divided into plural pieces of communication data each including selection of heaters in plural heater arrays and a piece of communication data including selection of heaters in a single heater array, and various setting data are included in the latter piece of communication data. In this way, the communication data includes a smaller number of pieces of data than the number of heater arrays, thereby allowing a reduction in the number of data input terminals. Accordingly, the number of input circuits is reduced, thereby lowering the current to be consumed and also allowing reductions in the sizes of the substrate of the inkjet print head, an electric wiring board, and flexible cables. Moreover, the number of sealing regions is prevented from increasing due to an increase in the number of electrodes, thereby improving reliability.

Fifth Embodiment

Figure 16:
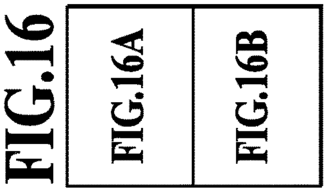
FIG. 16 is a diagram showing the relationship of FIGS. 16A and 16B, and FIGS. 16A and 16B are front surface diagrams illustrating a head substrate in an inkjet print head according to a fifth embodiment of the present disclosure.
Figure 16A:
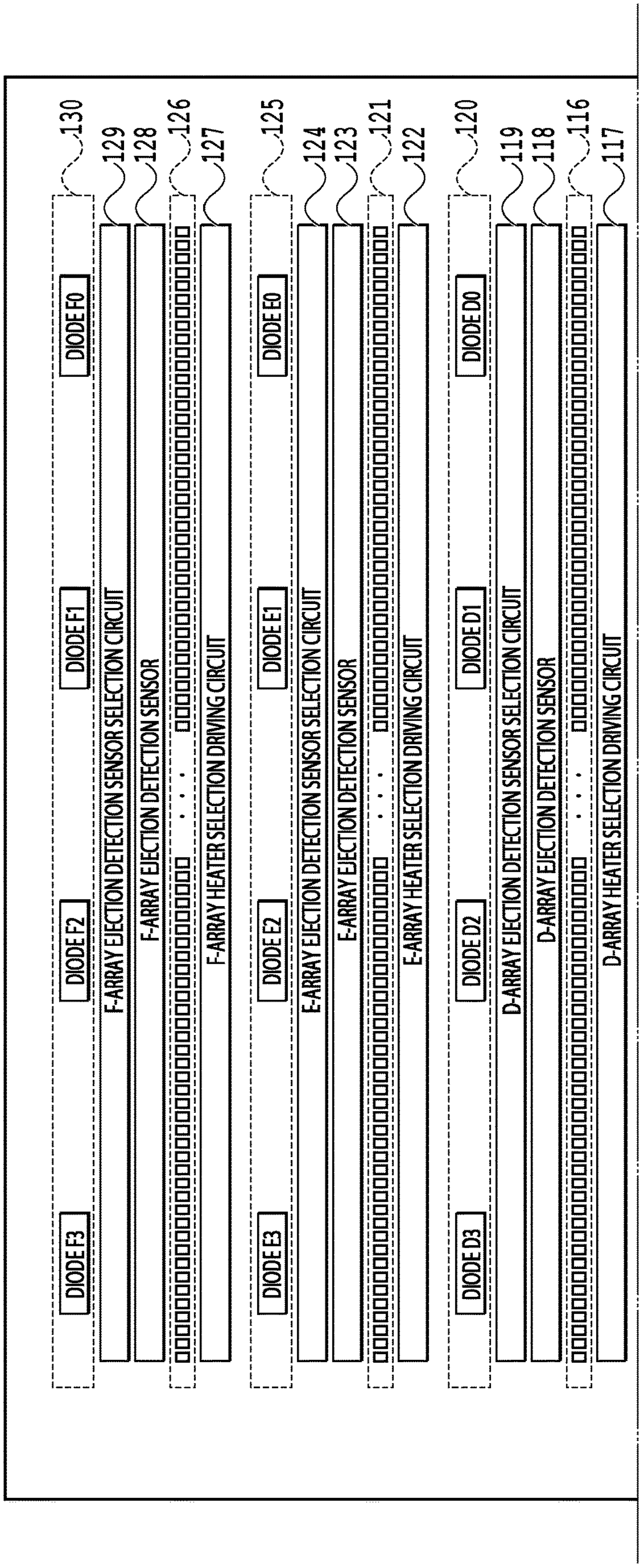
Figure 16B:
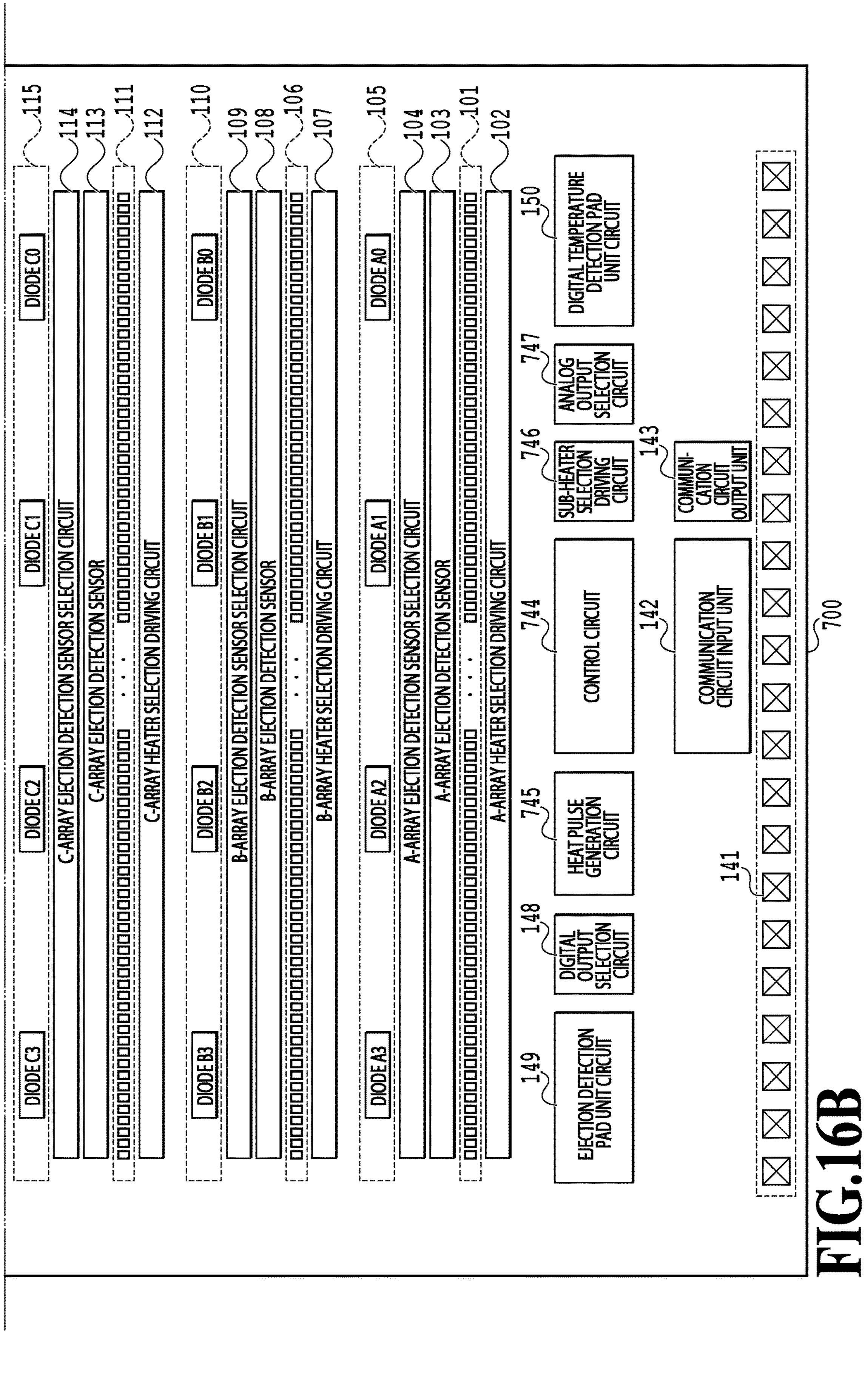

FIGS. 16A and 16B illustrate a head substrate in an inkjet print head according to a fifth embodiment of the present disclosure. A head substrate 700 in the fifth embodiment is the head substrate 500 in the fourth embodiment illustrated in FIGS. 13A and 13B additionally including F-array heaters as 1200-dpi liquid ejection heads. F-array heaters 126 are disposed, and an F-array heater selection driving circuit 127 selects desired heaters from the corresponding heater array. F-array ejection detection sensors 128, an F-array ejection detection sensor selection circuit 129, and diodes F0 to F3_130 are additionally included as well. Sub-heaters (not shown) which correspond to the sub-heater diodes F0 to F3_130 are additionally included as well.

Figure 17:
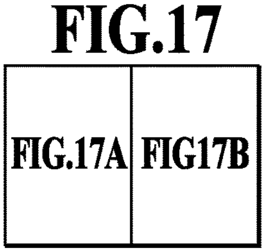
FIG. 17 is a diagram showing the relationship of FIGS. 17A and 17B, and FIGS. 17A and 17B are diagrams illustrating a communication data format for the head substrate according to the fifth embodiment.
Figure 17A:
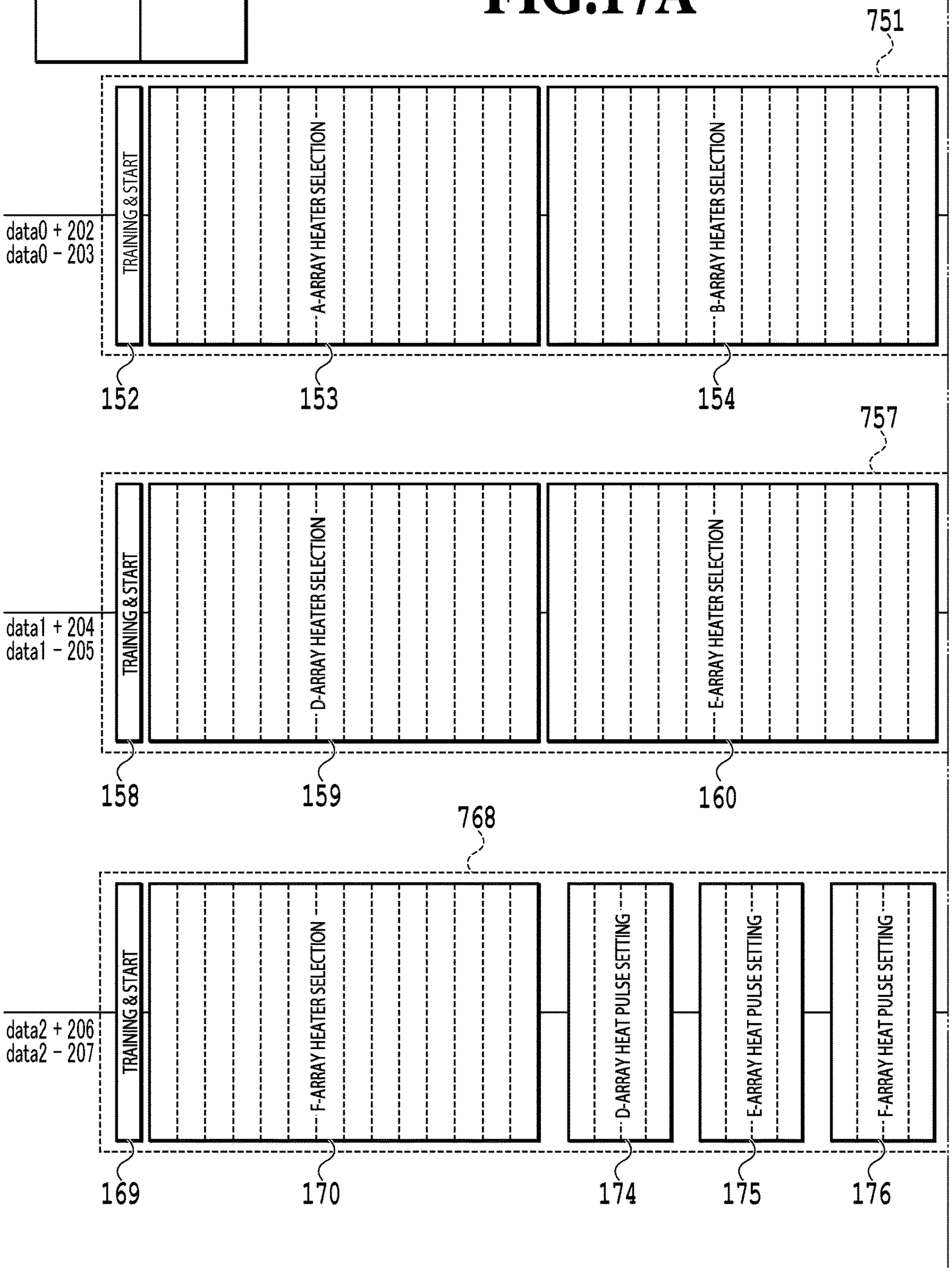
Figure 17B:
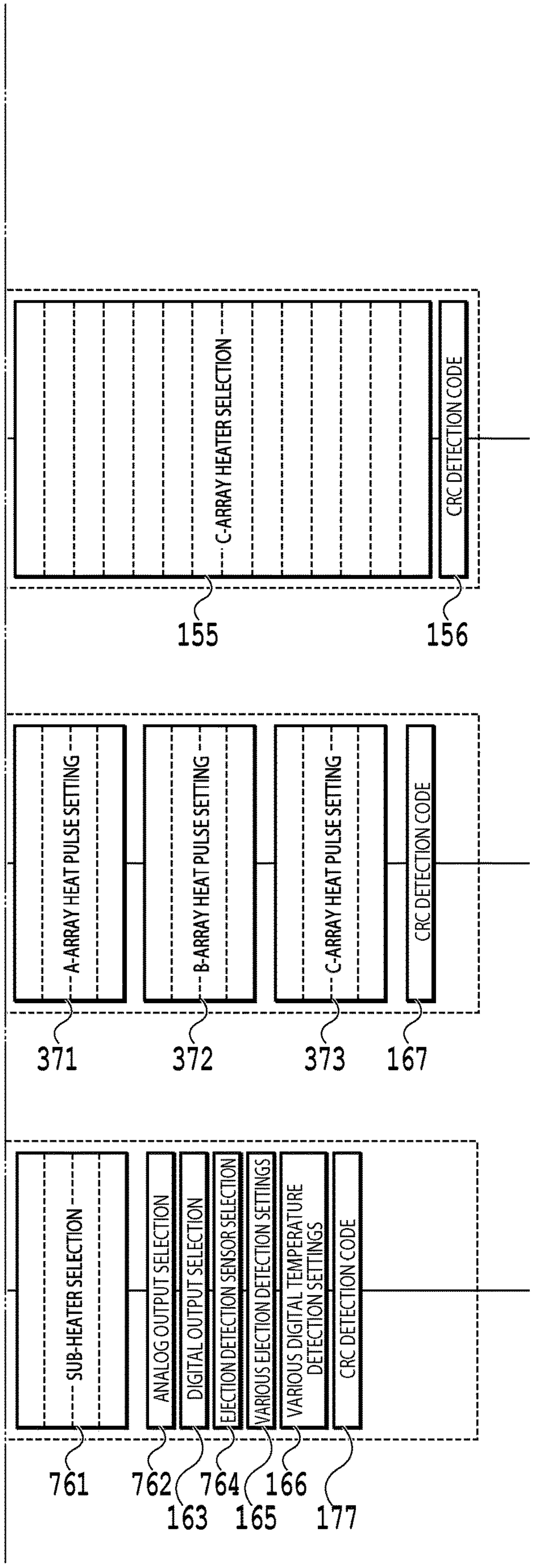

FIGS. 17A and 17B illustrate communication data formats for the head substrate according to the fifth embodiment. Communication data 751 inputted from data0+202 and data0−203 of the electrodes 341 starts with training & start 152, which is 1 byte. The next A-array heater selection 153, which is 14 bytes, designates desired heaters to be selected by the A-array heater selection driving circuit 102. B-array heater selection 154, which is 14 bytes, designates desired heaters to be selected by the B-array heater selection driving circuit 107. The C-array heater selection 155, which is 14 bytes, designates desired heaters to be selected by the C-array heater selection driving circuit 112. CRC detection code 156, which is 1 byte, designates a CRC calculation value of the A-array heater selection 153 to the C-array heater selection 155, and the communication data 751 ends.

Communication data 757 inputted from data1+204 and data1−205 of the electrodes 341 starts with training & start 158. The next D-array heater selection 159, which is 14 bytes, designates desired heaters to be selected by the D-array heater selection driving circuit 117. E-array heater selection 160, which is 14 bytes, designates desired heaters to be selected by the E-array heater selection driving circuit 122. A-array heat pulse setting 371, which is 4 bytes, designates the driving pulses for the driver (not shown) for the A-array heater selection driving circuit 102. B-array heat pulse setting 372 and C-array heat pulse setting 373, which are 4 bytes, likewise designate the driving pulses for the drivers (not shown) for the B-array heater selection driving circuit 107 and the C-array heater selection driving circuit 112. As in the fourth embodiment, CRC detection code 167, which is 1 byte, is the end of the communication data 757.

Communication data 768 inputted from data2+206 and data2−207 of the electrodes 341 starts with training & start 169, which is 1 byte. The next F-array heater selection 170, which is 14 bytes, designates desired heaters to be selected by the F-array heater selection driving circuit 127. The F-array heaters 126 are also formed of 1664 heaters, and time-division driving is performed with 16 time slots. Thus, the F-array heater selection 170 includes 14 bytes. D-array heat pulse setting 174, which is 4 bytes, designates the driving pulses for the driver (not shown) for the D-array heater selection driving circuit 117. E-array heat pulse setting 175, which is 4 bytes, designates the driving pulses for the driver (not shown) for the E-array heater selection driving circuit 122. F-array heat pulse setting 176, which is 4 bytes, designates the driving pulses for the driver (not shown) for the F-array heater selection driving circuit 127.

Sub-heater selection 761, which is 4 bytes, designates sub-heaters to be driven from among the 24 sub-heaters (not shown), which are heating elements. Analog output selection 762 designates one of the diodes for the A to E arrays as well as the diodes F0 to F3_130. Ejection detection sensor selection 764 designates sensors to be selected from among the ejection detection sensors for the A to E arrays as well as the F-array ejection detection sensors 128. Digital output selection 163, various ejection detection settings 165, and various digital temperature detection settings 166 are the same as those in the third embodiment. As in the fourth embodiment, CRC detection code 177, which is 1 byte, is the end of the communication data 768.

Figures 18, 18A:
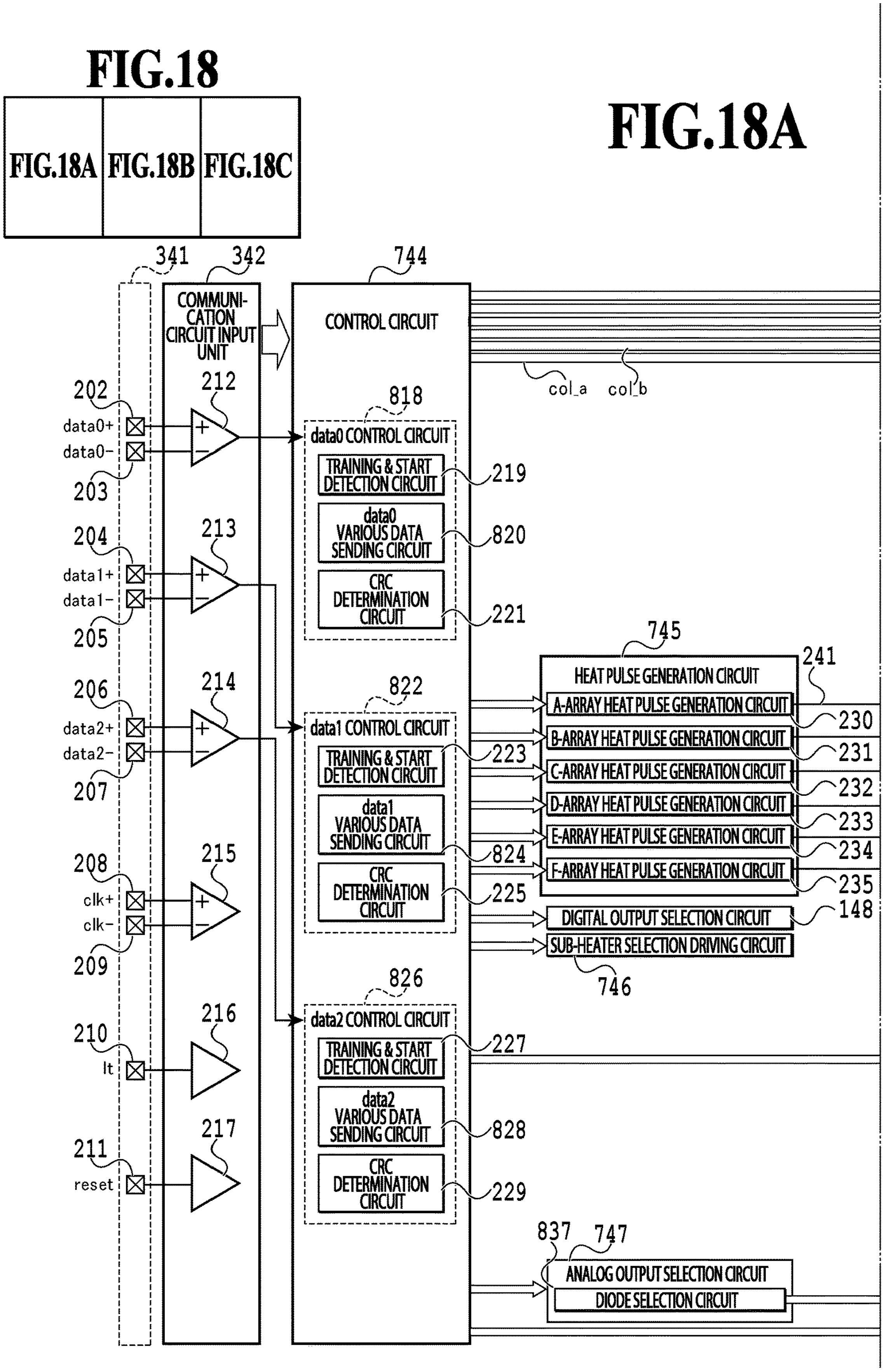
FIG. 18 is a diagram showing the relationship of FIGS. 18A, 18B and 18C, and FIGS. 18A, 18B and 18C are block diagrams of the head substrate according to the fifth embodiment.
Figure 18B:
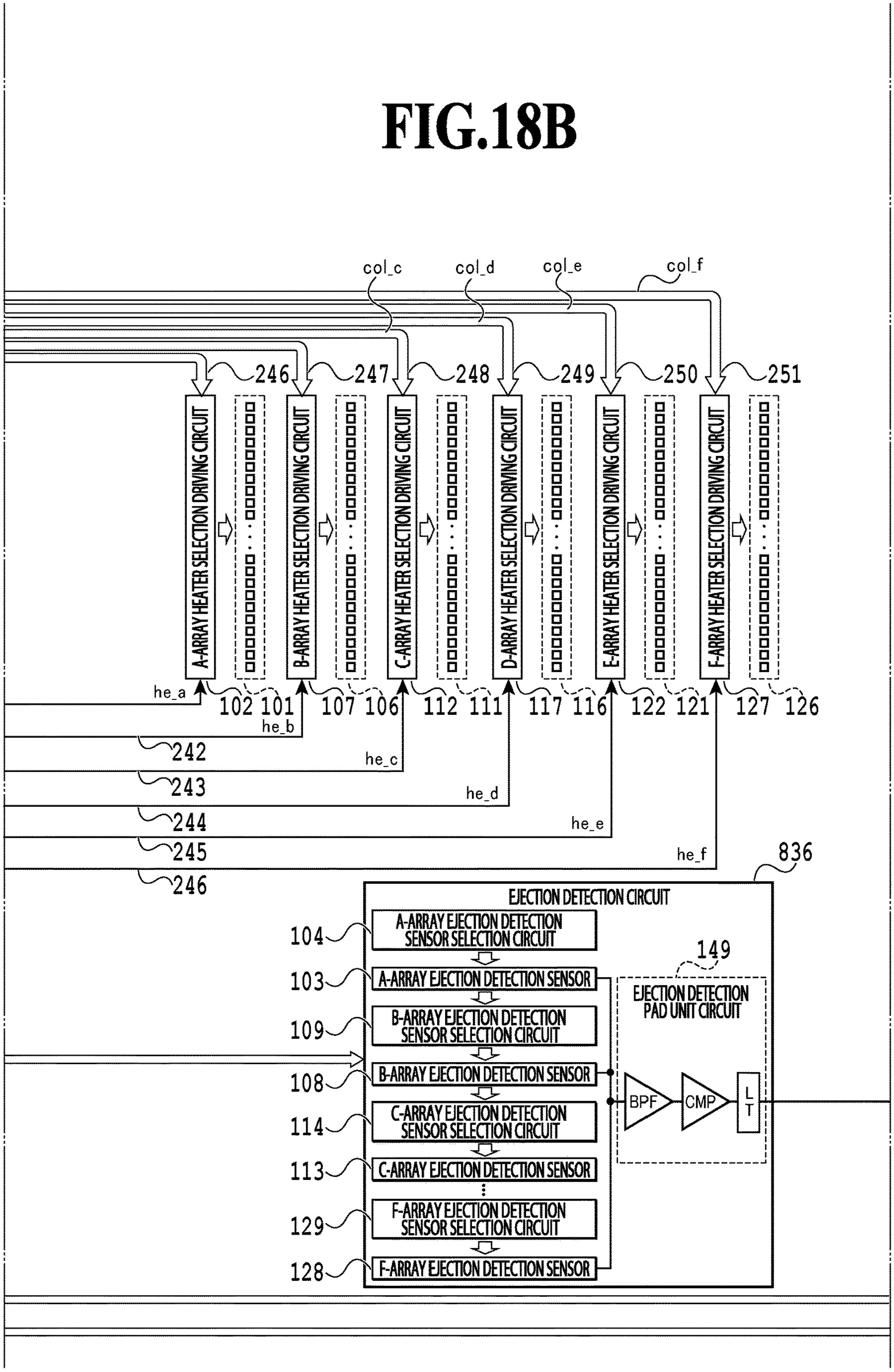
Figure 18C:
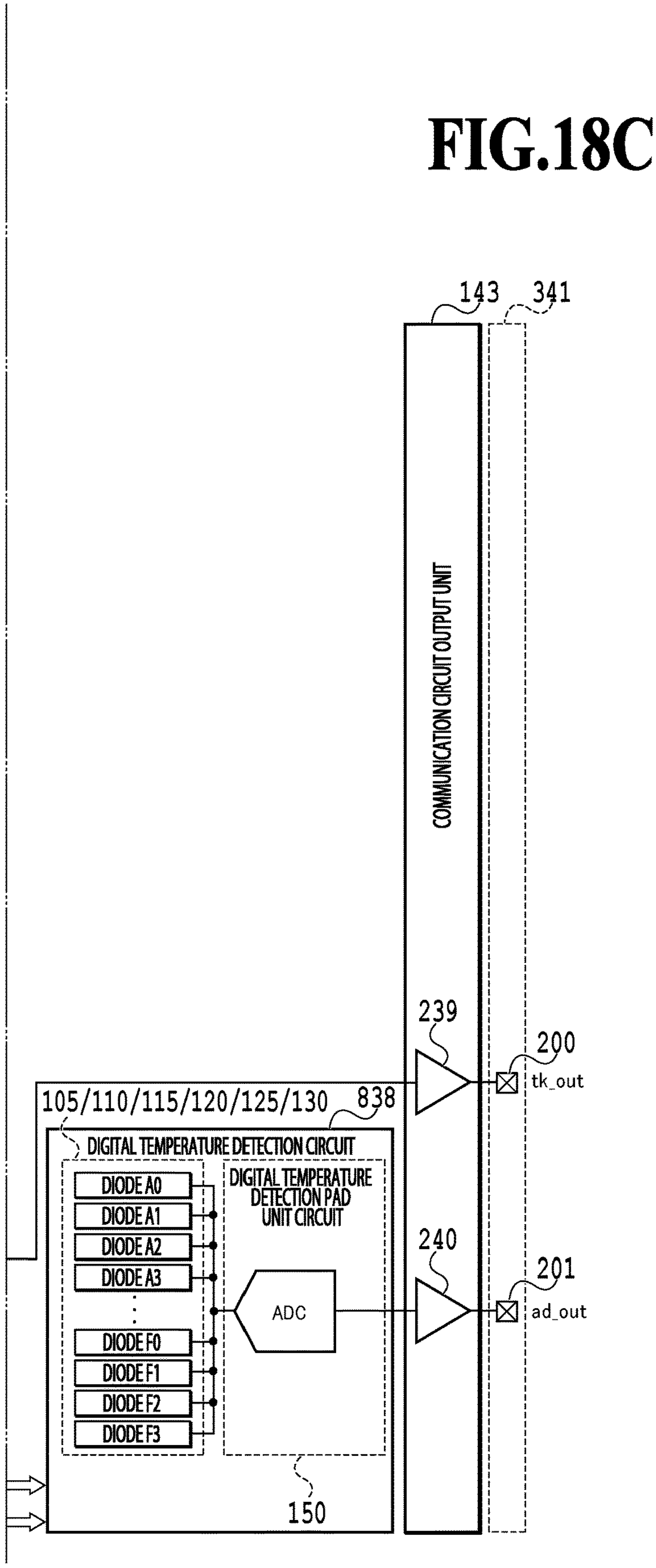

FIGS. 18A, 18B and 18C illustrate block configurations of the head substrate according to the fifth embodiment. As with the head substrate in the third embodiment illustrated in FIGS. 12A, 12B and 12C, the head substrate in the fifth embodiment includes the electrodes 341 and the communication circuit input unit 342.

A control circuit 744 has a data0 control circuit 818 that analyzes the communication data 751, and sends the data of the A-array heater selection 153 to the A-array heater selection driving circuit 102 via col_a246 with the data0 various data sending circuit 820. The data0 various data sending circuit 820 also sends the data of the B-array heater selection 154 to the B-array heater selection driving circuit 107 via col_b247, and sends the data of the C-array heater selection 155 to the C-array heater selection driving circuit 112 via col_c248.

The control circuit 744 has a data1 control circuit 822 that analyzes the communication data 757, and sends the data of the D-array heater selection 159 to the D-array heater selection driving circuit 117 via col_d249 with a data1 various data sending circuit 824. The data1 various data sending circuit 824 sends the data of the E-array heater selection 160 to the E-array heater selection driving circuit 122 through col_e250. The data1 various data sending circuit 824 also sends the data of the A-array heat pulse setting 371 to the A-array heat pulse generation circuit 230 of a heat pulse generation circuit 745. The data1 various data sending circuit 824 sends the data of the B-array heat pulse setting 372 to the B-array heat pulse generation circuit 231, and the data of the C-array heat pulse setting 373 to the C-array heat pulse generation circuit 232.

The control circuit 744 has a data2 control circuit 826 that analyzes the communication data 768, and sends the data of the F-array heater selection 170 to the F-array heater selection driving circuit 127 via col_f251 with a data2 various data sending circuit 828. The data2 various data sending circuit 828 sends the data of the D-array heat pulse setting 174 to the D-array heat pulse generation circuit 233 of the heat pulse generation circuit 745. The data2 various data sending circuit 828 sends the data of the E-array heat pulse setting 175 to an E-array heat pulse generation circuit 234 of the heat pulse generation circuit 745, and sends the data of the F-array heat pulse setting 176 to an F-array heat pulse generation circuit 235. The data2 various data sending circuit 828 sends the data of the sub-heater selection 761 to a sub-heater selection driving circuit 746, and sends the data of the analog output selection 762 to an analog output selection circuit 747. As with the A to E arrays, the data2 various data sending circuit 828 sends the data of the ejection detection sensor selection 764 to the F-array ejection detection sensor selection circuit 129.

As with the A, B, C, and D arrays in the third embodiment, a heat pulse signal he_e245 generated by the E-array heat pulse generation circuit 234 is outputted to the E-array heater selection driving circuit 122. A heat pulse signal he_f246 generated by the F-array heat pulse generation circuit 235 is outputted to the F-array heater selection driving circuit 127. As with the A to E arrays, the F-array ejection detection sensor selection circuit 129 selects a single desired sensor from among the F-array ejection detection sensors 128, and the result of ejection detection determination is outputted from an ejection detection circuit 836.

The analog output selection circuit 747 selects a single desired diode from among the 24 diodes being the diodes for the A to E arrays as well as the diodes F0 to F3_130 with a diode selection circuit 837. The analog voltage at the selected diode is subjected to digital conversion by a digital temperature detection circuit 838 and is outputted as the output signal ad_out201 from the electrodes 141 through the output buffer 240 of the communication circuit output unit 143.

As described above, the communication data format is divided into a piece of communication data including selection of heaters in three heater arrays and plural pieces of communication data each including selection of heaters in one or two heater arrays, and various setting data are included in the latter pieces of communication data. In this way, the communication data includes a smaller number of pieces of data than the number of heater arrays, thereby allowing a reduction in the number of data input terminals. Accordingly, the number of input circuits is reduced, thereby lowering the current to be consumed and also allowing reductions in the sizes of the substrate of the inkjet print head, an electric wiring board, and flexible cables. Moreover, the number of sealing regions is prevented from increasing due to an increase in the number of electrodes, thereby improving reliability.

OTHER EMBODIMENTS

The communication data formats in the embodiments described above are divided into communication data including selection of heaters in plural arrays (M arrays) and communication data including selection of heaters in a single array, control signals, and the like or communication data including selection of heaters in plural arrays (N arrays), control signals, and the like. The control signals and the like are included in communication data including selection of heaters in a single array or in communication data including a smaller number of arrays for which heaters are selected (N<M). There may be one or more pieces of communication data including only selection of heaters.

There may also be one or more pieces of communication data including selection of heaters, control signals, and the like.

The packaging densities of the liquid ejection heads of the head substrates are the same density of 1200 dpi, but may 600 dpi or another packaging density. Also, cases where the number of pieces of communication data as input signals from the electrodes of the head substrate is two or three have been presented. Alternatively, four or more pieces of communication data may be included according to an increase in the number of heater arrays. Thus, the number of heater arrays may be eight or more. Moreover, the analog output of a diode is subjected to digital conversion by the digital temperature detection circuit and outputted from an electrode. Alternatively, the analog output may be outputted directly from the electrode. Note that the installation of the ejection detection sensors, the ejection detection sensor selection circuits, and the ejection detection circuit is optional.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-194899, filed Dec. 6, 2022, which is hereby incorporated by reference herein in its entirety.

What is claimed is:

1. A head substrate including a plurality of arrays in each of which a plurality of heaters for ejecting a liquid are disposed, the head substrate comprising:

one or more first reception units configured to receive communication data including heater selection data on a plurality of arrays, the heater selection data being for selecting the heaters;

one second reception unit configured to receive communication data including heater selection data on a single array and setting data; and a second driving unit configured to drive a plurality of sub-heaters so as to reach a predetermined temperature in order to eject the liquid, wherein the second reception unit receives setting data for selecting the sub-heaters for the second driving unit.

2. The head substrate according to claim 1, further comprising a first driving unit configured to select and drive the heaters on an array-by-array basis, wherein the second reception unit receives setting data designating a driving pulse for the first driving unit.

3. The head substrate according to claim 1, further comprising a digital circuit configured to monitor any digital signal in the head substrate, wherein the second reception unit receives setting data for selecting a monitored output to be outputted from the digital circuit.

4. The head substrate according to claim 1, further comprising an ejection detection unit including a plurality of sensors configured to detect ejection of the liquid, wherein the second reception unit receives setting data for selecting the sensors of the ejection detection unit.

5. A head substrate including a plurality of arrays in each of which a plurality of heaters for ejecting a liquid are disposed, the head substrate comprising:

one or more first reception units configured to receive communication data including heater selection data on a plurality of arrays, the heater selection data being for selecting the heaters;

one second reception unit configured to receive communication data including heater selection data on a single array and setting data; and a plurality of detection elements configured to output an analog signal, wherein the second reception unit receives setting data for selecting the detection elements.

6. The head substrate according to claim 5, wherein the detection elements are a plurality of diodes disposed near the liquid ejection heads.

7. The head substrate according to claim 6, further comprising a conversion unit configured to perform analog-digital conversion on output of the diodes, wherein the second reception unit receives setting data setting a circuit constant of the conversion unit.

8. The head substrate according to claim 5, further comprising an ejection detection unit including a plurality of sensors configured to detect ejection of the liquid, wherein the second reception unit receives setting data for selecting the sensors of the ejection detection unit.

9. A head substrate including a plurality of arrays in each of which a plurality of heaters for ejecting a liquid are disposed, the head substrate comprising:

one or more first reception units configured to receive communication data including heater selection data on a plurality of arrays, the heater selection data being for selecting the heaters; and one second reception unit configured to receive communication data including heater selection data on a single array and setting data, wherein the first and second reception units include a receiver configured to receive a differential signal, an input buffer, and a control circuit configured to analyze the heater selection data and the setting data.

* * * * *